No. 885,114. PATENTED APR. 21, 1908.
S. WARING.
PAPER MEASURING AND ROLLING MACHINE.
APPLICATION FILED AUG. 26, 1907.
6 SHEETS—SHEET 4.
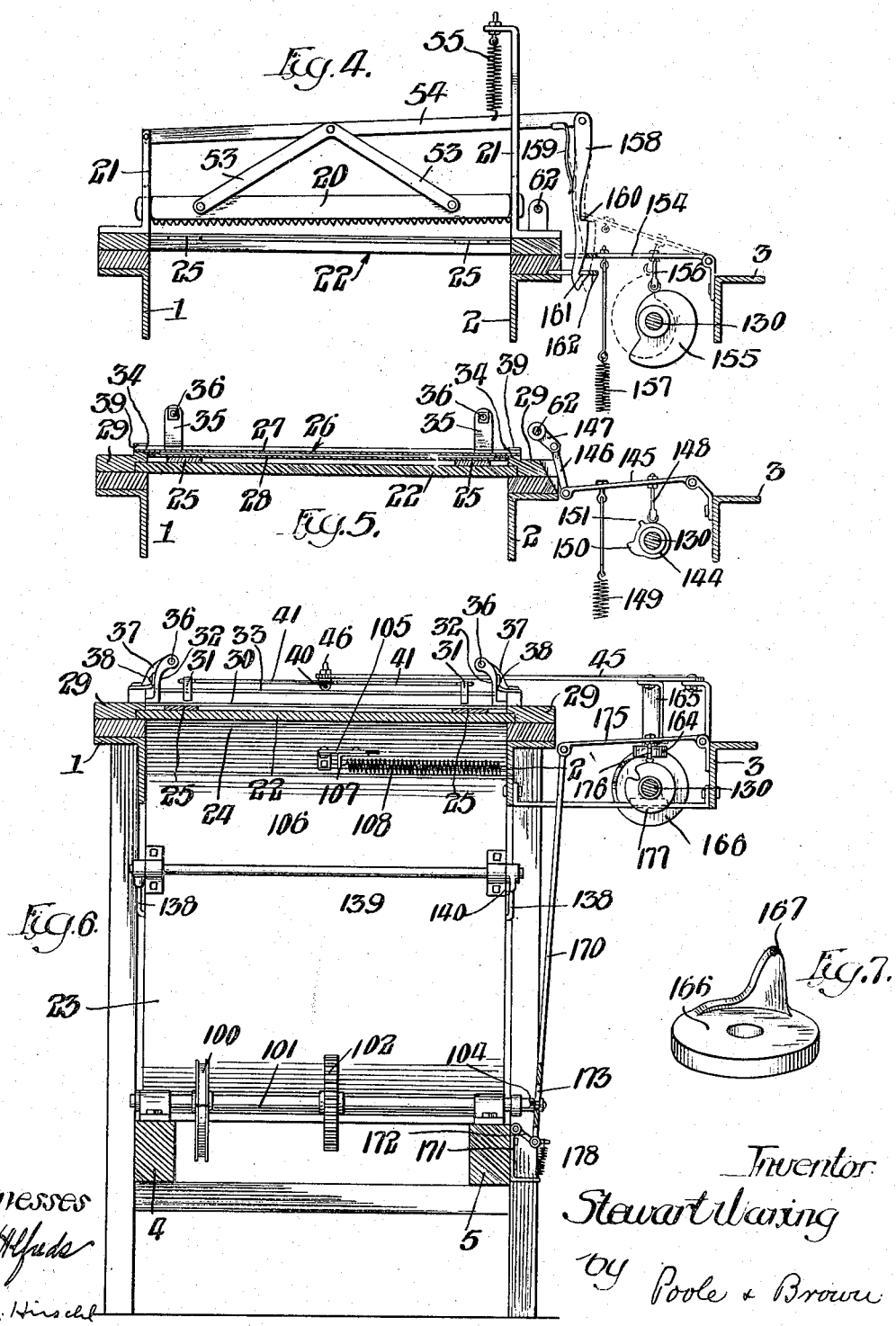

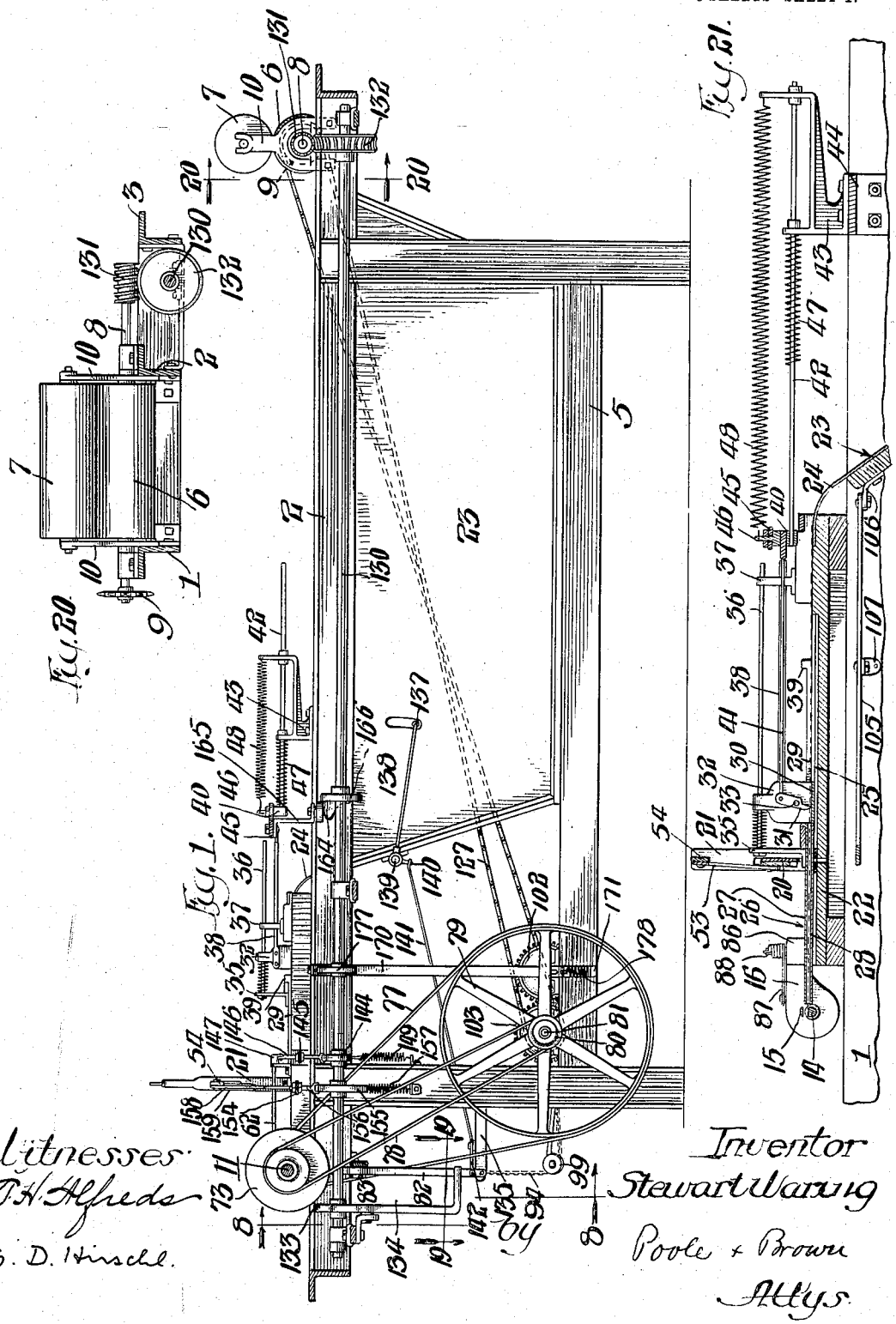

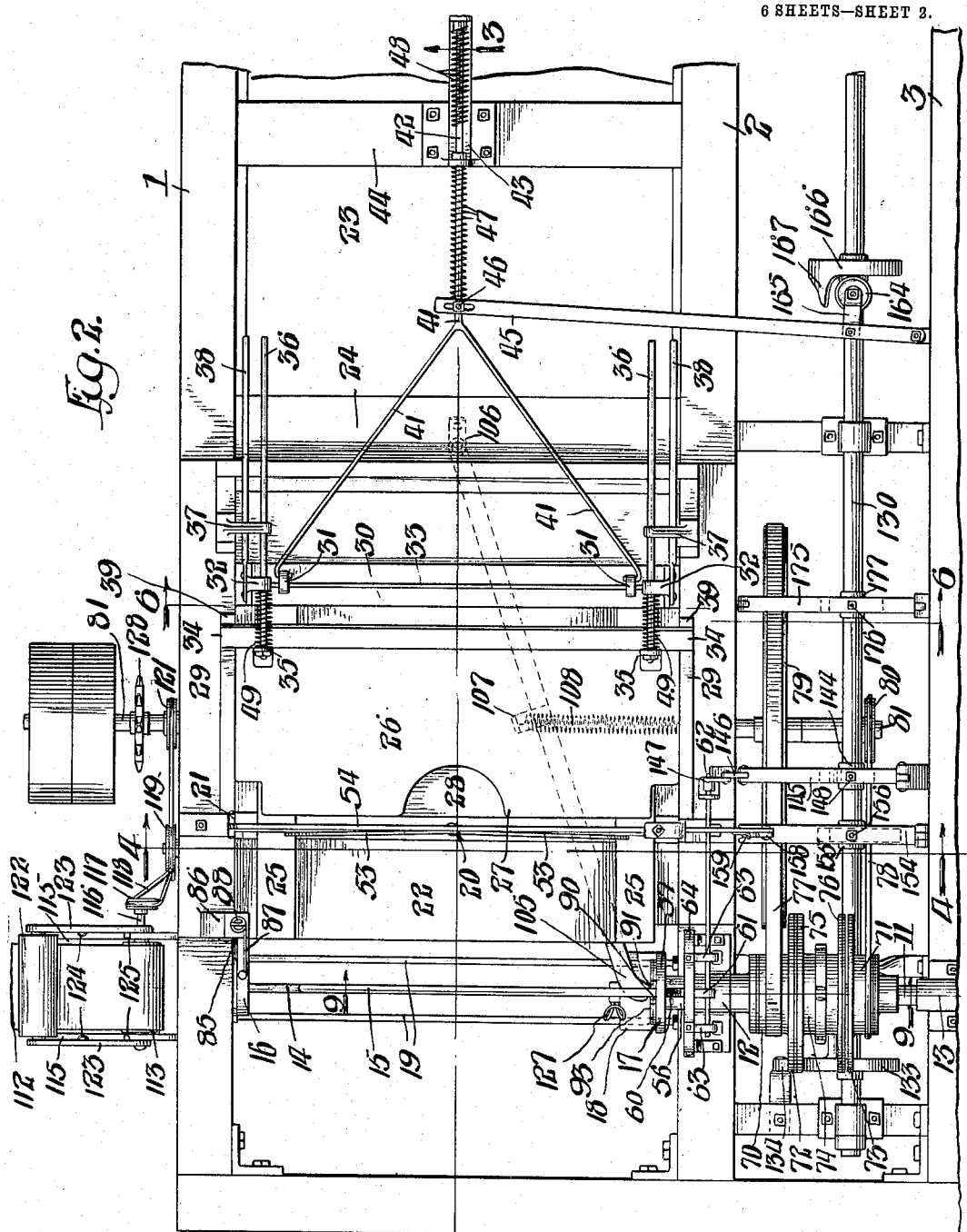

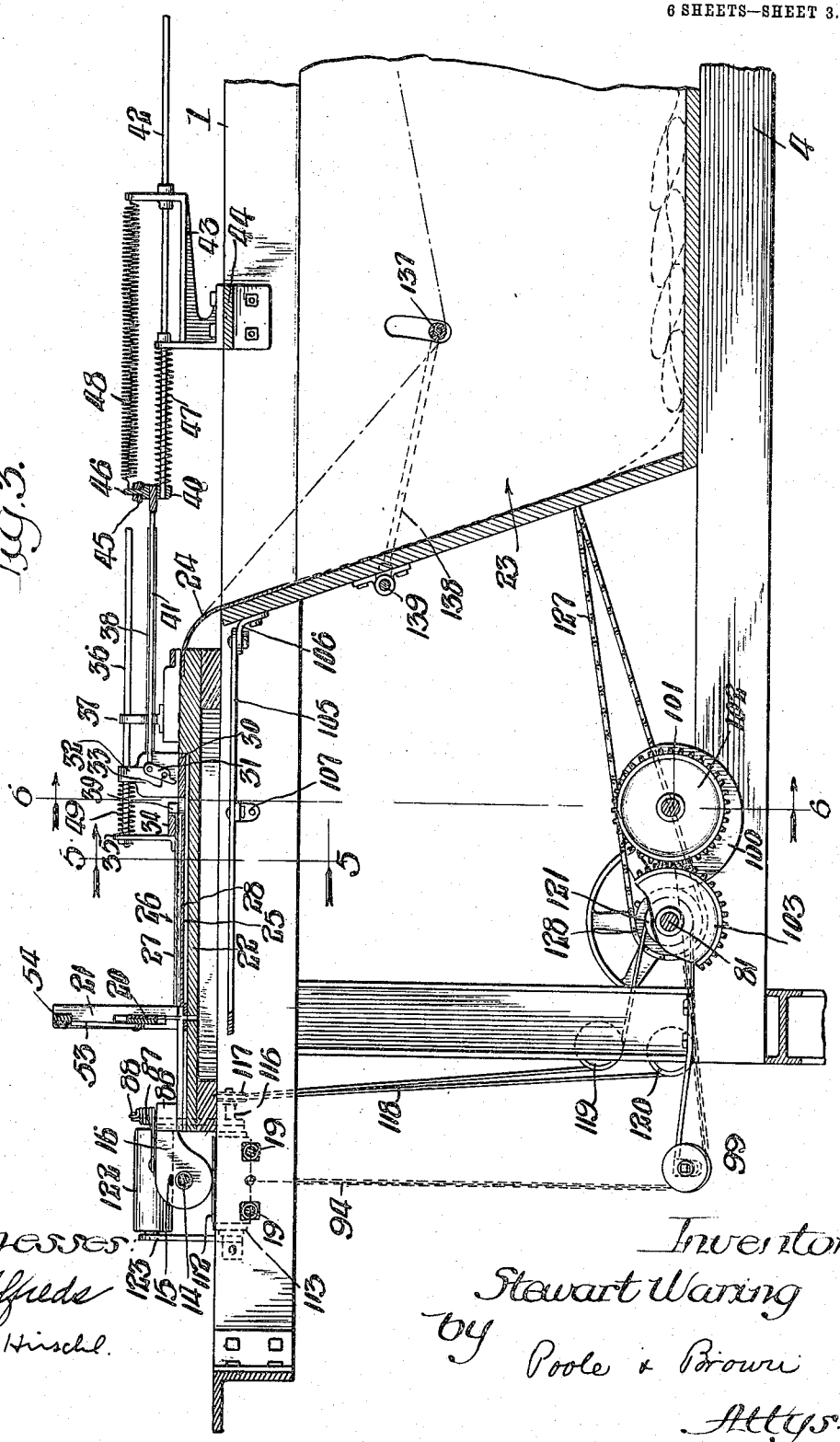

No. 885,114. PATENTED APR. 21, 1908.
S. WARING.
PAPER MEASURING AND ROLLING MACHINE.
APPLICATION FILED AUG. 26, 1907.
6 SHEETS—SHEET 5.
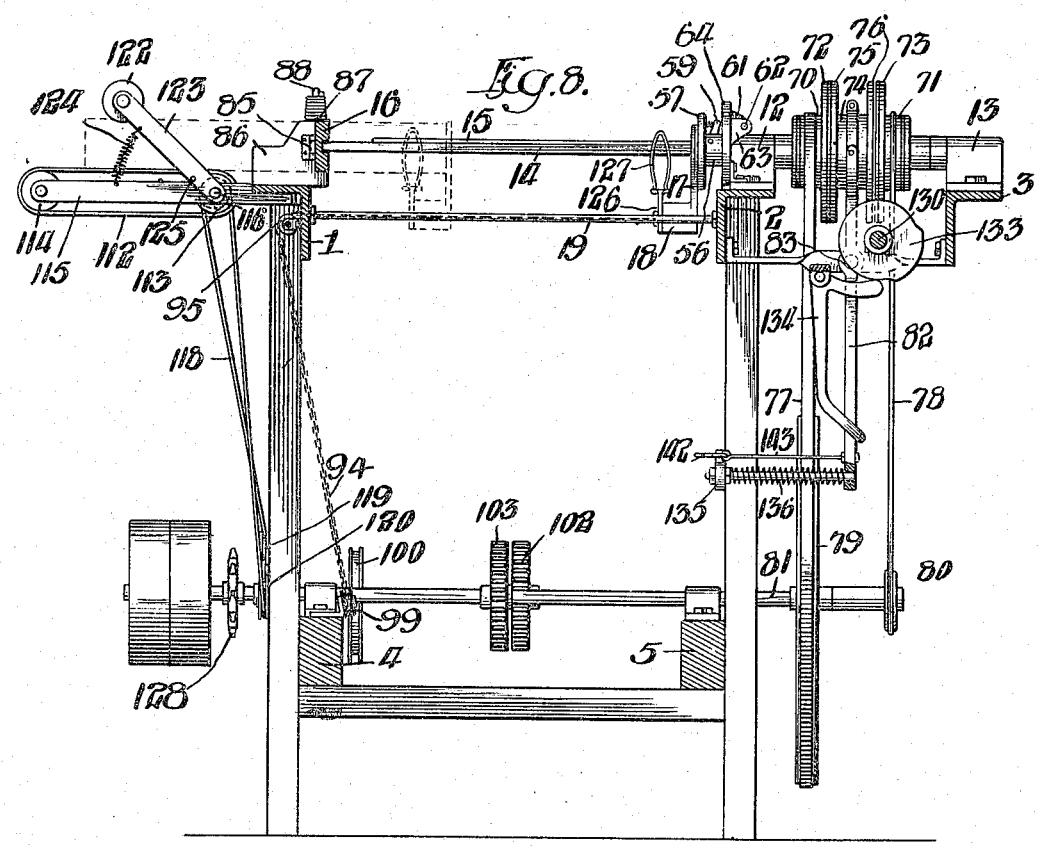
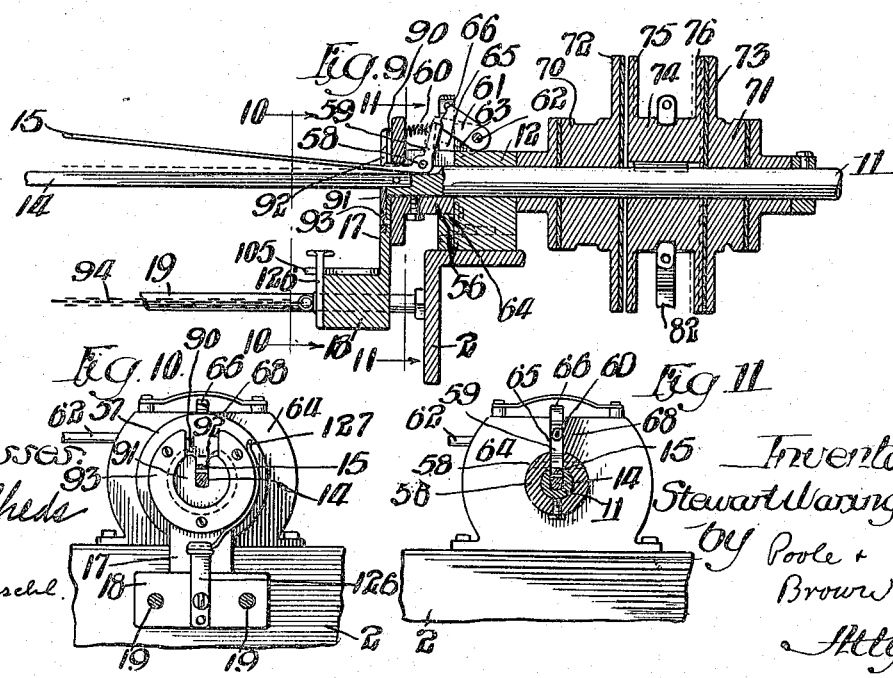

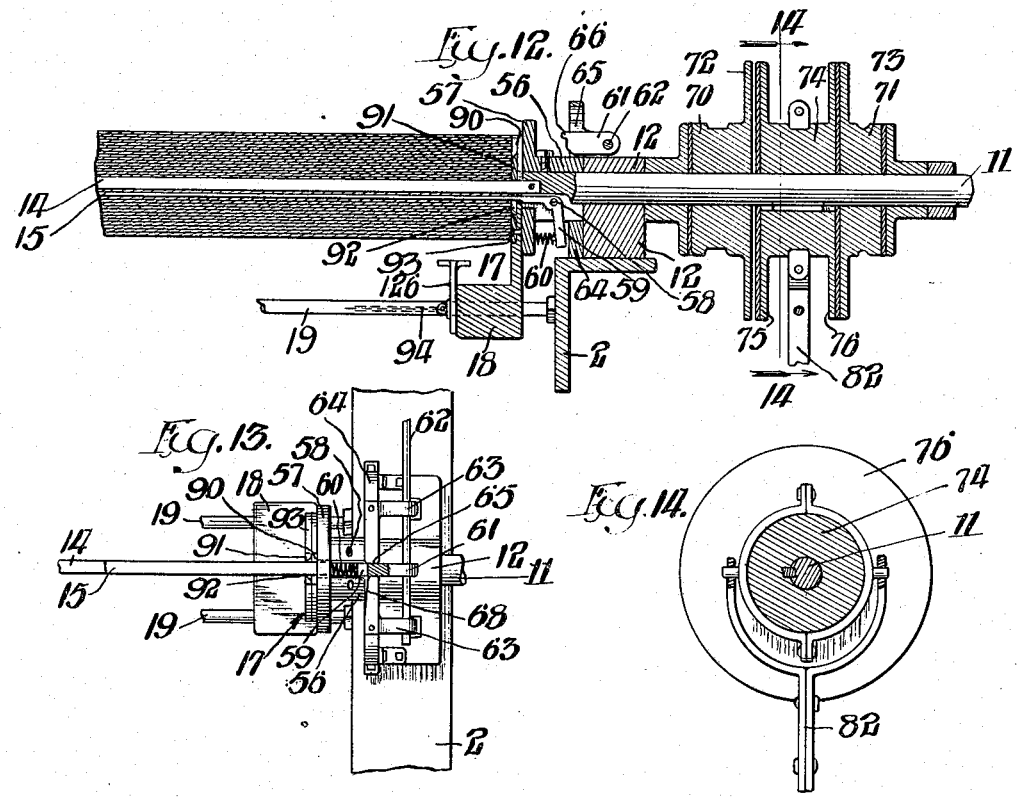

UNITED STATES PATENT OFFICE.

STEWART WARING, OF EVANSTON, ILLINOIS.

PAPER MEASURING AND ROLLING MACHINE.

No. 885,114.            Specification of Letters Patent.            Patented April 21, 1908.

Application filed August 26, 1907. Serial No. 390,192.

*To all whom it may concern:*

Be it known that I, STEWART WARING, a citizen of the United States, and a resident of Evanston, in the county of Cook and State of Illinois, have invented certain new and useful Improvements in Paper Measuring and Rolling Machines; and I do hereby declare that the following is a full, clear, and exact description thereof, reference being had to the accompanying drawings, and to the letters of reference marked thereon, which form a part of this specification.

This invention relates to a machine for cutting from a long or continuous web of wall paper or the like, pieces of desired or predetermined length, and rolling the severed pieces in separate rolls; the machine being intended mainly for the purpose of preparing wall paper for the market in the form in which it is generally sold, that is to say, in rolls, each of which contains the same quantity of paper.

The invention consists in the matters hereinafter described and pointed out in the appended claims.

A machine embodying my invention embraces as its main or principal features, a cutting device having a reciprocating cutting blade by which the web is severed transversely to form the pieces or lengths of paper, each of sufficient length to form a single roll, an intermittingly rotating mandrel on which the severed pieces are rolled, said mandrel having periods of rotation during which the paper to form a roll is wound thereon, alternating with periods of rest during which the completed roll is removed from the mandrel and continuously rotating feed rolls, by which the continuous strip or web of paper is advanced continuously toward the cutting device and the said mandrel. An open topped receptacle is located between the said feed rolls and the cutting device in position to receive the paper from the continuously rotating feed rolls, and within which the paper accumulates during the intervals between the periods of rotation of the mandrel by which each roll of paper is formed.

The machine includes, in connection with the cutting device, means for gripping the end of the web at the point at which it is severed and advancing the same past the cutting device to the mandrel, which latter is provided with means for clamping the end of the web to the mandrel preparatory to the rolling operation.

The machine also includes means for automatically controlling or timing the operations of the cutting and gripping devices and of the mandrel and its clamping member, including a shaft carrying a series of cams, and which is adapted to make one complete rotation in order to effect the performance of the complete cycle of operation by which such roll is formed, said shaft being connected with the feed rolls by positively acting gearing, and the peripheral speed of the feed rolls being so adjusted with respect to the rotation of the said shaft, that the desired length of paper will be fed to the machine by said feed rolls during each complete rotation of the shaft.

The machine also includes a movable part or trip member, located in position to be acted upon by the tightening of the web against it, in the part of said web between the mandrel and feed rolls, when the portion of the web fed into the said receptacle by the feed rollers has been withdrawn therefrom by being wound upon the rotative mandrel; said trip member being connected with and operating a friction clutch by which the mandrel is connected with its driving mechanism; these parts being so arranged that when all of the paper at one time accumulated in the said receptacle is withdrawn therefrom and the slack between the feed rolls and the revolving mandrel has been taken up, so as to draw the web taut against the said trip member, the latter will be shifted by the pressure thereon of the web with the effect of operating said friction clutch so that the mandrel will be turned thereby no faster than is necessary to take up the paper as it is fed to the machine by the feed rolls.

The machine also includes means for stripping or removing the finished rolls endwise from the mandrel, operating during the intervals between the periods of rotation of the mandrel.

The invention may be better understood by reference to the accompanying drawing, in which:—

Figure 1 is a view in side elevation of the machine embodying my invention. Fig. 2 the plan view on a larger scale of the parts of the machine adjacent to the mandrel and severing devices. Fig. 3 is a central, longitudinally vertical section taken upon the line 3—3 of Fig. 2. Fig. 4 is a cross section showing the cutting device, taken on the line 4—4 of Fig. 2. Fig. 5 is a transverse section taken upon the line 5—5 of Fig. 3. Fig. 6 is a transverse section illustrating the gripping devices, taken on the line 6—6 of Figs. 2 and 3. Fig. 7 is a perspective view of the cam which operates the devices by which the end of the web is gripped and advanced to the mandrel. Fig. 8 is a sectional elevation of the machine taken on the line 8—8 of Fig. 1. Fig. 9 is a sectional view, taken axially through the mandrel and the driving parts on the mandrel shaft, on the line 9—9, Fig. 2. Fig. 10 is a detail section taken upon line 10—10 of Fig. 9. Fig. 11 is a detail section taken upon line 11—11, Fig. 9. Fig. 12 is a section similar to Fig. 9, showing a roll of paper upon the mandrel. Fig. 13 is an enlarged, detail, plan view of the parts located at the inner end of the mandrel, including the parts concerned in operating the clamping device on said mandrel. Fig. 14 is a detail section taken upon line 14—14 of Fig. 12. Fig. 15 is a detail face view of a stop plate illustrated in Figs. 12 and 13. Fig. 16 is a detail elevation of the flanged collar on which is mounted the mandrel clamping member. Fig. 17 is a detail elevation of the laterally sliding stripper plate, by which the roll is thrust endwise from the mandrel. Fig. 18 is a detail view of a rotative notched disk which is carried by said stripper plate and which has sliding engagement with the mandrel. Fig. 19 is a detail section taken on line 19—19 of Fig. 1. Fig. 20 is a detail section showing the feed rolls of the machine, taken on line 20—20 of Fig. 1. Fig. 21 is an enlarged, detail, longitudinal section corresponding to the upper part of the sectional view, Fig. 3, illustrating a changed position of devices for gripping the cut off end of the web and advancing the same to the mandrel.

Referring to the said drawings, the machine therein illustrated embraces three longitudinal parallel main frame members 1, 2 and 3 at the top of said frame on which the principal operative parts of the machine are supported. Below said frame members 1 and 2 are other longitudinal frame members 4 and 5, on which other parts are mounted. At one end of the machine frame are located two transversely arranged horizontal feed rolls 6 and 7. The feed roll 7 is arranged vertically above the roll 6, and the latter is mounted on a shaft 8 provided at one end with a sprocket wheel 9 through which the same is driven. The upper feed roll 7 is provided with a shaft which is mounted to turn freely in standards 10 10 (Figs. 1 and 20) attached to and rising from the frame members 1 and 2. Said upper feed roll 7 is adapted to rest by gravity on the roll 6. Said feed roll 7 presses on and is turned by contact with the web of paper moving between the feed rolls. Said feed rolls are preferably made of metal, and are adapted to form calendering rolls by which final finish is given to the web of paper before it is formed into rolls by the operation of the machine.

At the end of the machine frame remote from the said feed rollers, is a transversely arranged, horizontal mandrel shaft 11 mounted in bearings 12 and 13 attached respectively to the frame members 2 and 3. Said mandrel shaft has attached to its inner end a mandrel 14 which extends across the space between the frame members 1 and 2. Said mandrel is provided with a clamping member 15, by which the end of the web of paper may be temporarily clamped or secured thereto, the same having the form of an arm which is pivoted at one end to the mandrel shaft so as to swing on an axis transverse to said mandrel. Said clamping member is adapted to be swung upwardly away from the mandrel when the latter stands in position with said member vertically over the same, in a manner to permit the end of the web to be inserted horizontally between the mandrel and the clamping member. Devices are provided for operating said clamping member 15, as hereinafter described. The extremity of said mandrel 14, over which the finished roll is removed, is sustained during the periods of rotation of the mandrel by engagement with a bearing socket formed in a laterally swinging bearing plate 16, mounted on the frame member 1. A device for removing the finished rolls endwise from the mandrel includes an upright stripping plate 17, which is attached to and rises from a sliding block 18 mounted on parallel, horizontal, transverse guide rods 19 19 (Figs. 8, 9 and 10), attached at their ends to the frame members 1 and 2. Devices are provided for giving movement to the said stripper plate 17 in a direction longitudinally of the mandrel, as hereinafter described. Adjacent to said mandrel 14 and between the same and the feed rolls 6 and 7, is located a transversely arranged cutting device, comprising a vertically movable shearing blade 20 which slides vertically at its ends in guide slots formed in standards 21 21, attached to and rising from the frame members 1 and 2. Said shearing blade acts in connection with a slot formed in a horizontal plate or table 22, over which the web of paper moves as it approaches the mandrel.

Supported on the machine frame, between the feed rolls 6 and 7 and the adjacent end of the table 22, is a receptacle 23 adapted to receive the web of paper from said feed rolls and in which the same accumulates at intervals in the operation of the machine.

The forward end wall of said receptacle is located adjacent to the rear end of the table 22 and is connected with the said table by curved plate 24 forming a smooth rounded surface over which the web passes from the receptacle over to the top surface of said table. Mounted on said table is a paper guide 26 which is adapted to reciprocate horizontally over the table toward and from the mandrel. Said paper guide consists of rigidly connected, upper and lower parallel plates 27 and 28 which extend transversely of the machine above and parallel with the table 22 and form between them a guide passage for the web of paper. Said plates are clearly shown in Figs. 3, 5 and 21. Said paper guide 26 is supported and slides on guide strips 25 25 attached to the top of the table 22, and is held from lateral movement by longitudinal guide members 29 29 (Figs. 2 and 5) secured to the top surfaces of the frame members 1 and 2 at opposite sides of the table 22. Mounted on said table, between the said horizontally sliding paper guide and the paper receptacle 23 is a horizontally reciprocating paper-gripper embracing a transversely extending base plate 30, over which the web of paper passes, and a plurality of gripping fingers 31 31 arranged to clamp the paper against the top of said plate 30. Said gripping device as a whole has sliding movement with the paper guide 26 in the direction of the path of the paper and also has limited sliding movement relatively to said paper guide. Said paper guide 26 is made of sufficient length, in the direction of the path of the paper, to extend from a point at the rear of the cutting device to a point adjacent to the mandrel 14, as clearly seen in Figs. 3 and 21. In the operation of the machine said paper guide is moved horizontally from the position shown in Fig. 3, where it is withdrawn from beneath the blade 20 of the cutting device, to the position shown in Fig. 21 in which it is advanced beneath the cutting knife with its forward end closely adjacent to the mandrel.

The gripping device stands normally in the position shown in Fig. 3, at a short distance to the rear of the said paper guide and is adapted to move forwardly with said paper guide and also to be advanced toward the paper guide to the position shown in said Fig. 21. Said gripping device serves when in the position shown in Fig. 3 to grip and hold the end of the web resting on the table 22 at the time the piece which has been rolled on the mandrel is severed from said web. Said gripping device when advanced toward the mandrel with the paper guide serves to advance the end of the web until in position to be clamped upon the mandrel; the portion of the web between the said gripping device and the mandrel being kept flat or held in a straight line by being confined between the upper and lower plates 27 and 28 of the paper guide during the time the cut off end of the paper is being so advanced by the action of the gripper to the mandrel. The part of the web forward of the gripper is advanced through the paper guide so that its forward edge will project beyond said paper guide a distance sufficient to enable it to be properly engaged with the clamping arm 15 of the mandrel.

To the ends of the base plate 30 of the gripping device are secured upwardly extending brackets or arms 32 and to said arms above the said plate 30 are secured the ends of a horizontal transverse pivot rod 33, on which are pivotally mounted the gripping dogs 31. The base plate 30, the brackets 32 32 and the pivot rod 33 together constitute the gripper frame, which rests and slides on the longitudinal bearing strips 25 25, on the top of the table 22. The paper guide 26 is provided at the rear margins with two laterally projecting, horizontal arms 34 34, formed, as shown, by the ends of a flat bar which extends across the rear margin of the top plate 27 of said paper guide. The said arms 34 34 extend over and slide upon the top surface of the guide pieces 29 29. The forward movement of the paper guide is limited by contact of the said arms 34 34 with the standards 21 21 of the cutting device and the rearward movement of said paper guide is limited by the contact of said arms with fixed stops 39 39 which rise from the guide pieces 29 29. The paper guide 26 is provided with two rigidly attached upwardly extending arms or brackets 35 having guide apertures through which pass the rear ends of horizontal, longitudinally extending rods 36 36, which rods are secured to the inwardly extending overhanging ends of the upwardly extending arms or brackets 32 32 of the gripper frame. At their rear ends said rods 36 36 pass through bearing apertures in fixed guide brackets 37 37, which are secured to and rise from the frame members 1 and 2. Horizontal, longitudinally arranged guide rods 38 38 are attached to the outer faces of the brackets 32 32 of the gripper frame and pass through guide apertures in said stationary brackets 37 37. Said guide rods 38 38 serve to hold the gripper frame from lateral movement as it slides upon the longitudinal bearing strips 25 25.

Movement is transmitted to both the paper guide 26 and the gripper frame through the medium of a horizontally movable head 40 located centrally with respect to said parts and above the level thereof and connected with the pivoted gripping dogs 31 31, above the pivot rod 33 thereof, by means of divergent connecting rods 41, the forward ends of which are pivotally connected with the upper ends of said gripping dogs. Said gripping dogs have the form of levers, the lower ends of which are inclined downwardly and forwardly from the said pivot rod 33, and are adapted, when swung downwardly and rearwardly, to approach the base plate 30 over which the paper passes and to come into gripping engagement with the paper. The parts are so arranged that when the upper ends of the gripping dogs are thrown forward their lower ends are arrested by their bearing engagement with the base plate 30, so that, assuming the gripping device to be at the rearward limit of its movement, as shown in Fig. 3, when the head 40 is advanced, the said dogs 33 are first thrown into gripping position and the gripper frame is then moved forward with the head 40 in the further advance movement of the latter. The head 40 mounted on the forward end of a horizontal, longitudinally arranged, endwise sliding rod 42 (Figs. 1 and 3), which is supported in longitudinally separated bearings in a bearing bracket 43 attached to a transverse frame member 44 which is secured to and extends between the frame members 1 and 2 at a point over the receptacle 23. The block or head 40 is connected with a transversely arranged operating lever 45 which is pivoted by a vertical pivot to the frame member 3 and is adapted to oscillate in a horizontal plane. Said head 40 is provided with an upright pivot stud 46 (Fig. 3) engaging a longitudinal slot in the adjacent end of said operating lever 45. A spirally coiled, expansively acting spring 47 surrounds the rod 42 and is held in compression between the head 40 and the adjacent end of the bracket 43. Another coiled spring 48, acting by its contraction, is connected with the stud 46 and an upwardly extending part of said bracket 43. A part only of said spring 48 is shown in the plan view, Fig. 2. Said springs 47 and 48 operate to hold the head 40 at the rearward limit of its movement. Means acting on the operating lever 45, to give movement to the paper guide and gripper frame, will be hereinafter described.

On the rods 36 36, which, as before stated, are secured to the brackets 32 32 of the gripper frame and have sliding engagement with the bracket arms 35 35 on the paper guide 26, are two expansively acting coiled springs 49 49, the ends of which act upon said brackets 32 and 35 and tend to hold the paper guide a short distance from the gripper frame, this being the position of the parts indicated in Figs. 2 and 3. The rearward movement of the paper guide is effected through its connection with the gripper frame afforded by the rods 36 36 and heads or nuts on the rear ends of said rods, which engage the brackets 35 35. These parts are so arranged that, at the beginning of the rearward movement of the paper guide and gripper frame, the gripper frame and rods 36 36 will be carried rearwardly without any movement of the paper guide, until the forward ends of the rods 36 36 come into contact with the brackets 35 35 and arrest the further movement of the gripper frame relatively to the paper guide, after which the latter moves rearwardly with said gripper frame.

When the gripper frame and paper guide reach the rearward limit of their movement, as shown in Fig. 3, the arms 34 34 on said paper guide strike the stops 39 39 which are so located as to arrest the movement of the paper guide at the time the gripper frame reaches the forward limit of its movement. The springs 49 49 provided as described, tend to maintain the paper guide 36 at the desired distance forward of the gripper frame during the forward movement of these parts. In the forward movement of the gripper frame, the said gripper frame is maintained at a distance from the rear edge of the paper guide, as indicated in Fig. 3, by the action of the said springs 49 49, until the paper guide reaches the forward limit of its movement when the arms 34 34 strike the standards 21 21 of the cutting device, and the forward movement of the paper guide is then arrested, with forward end closely adjacent to the mandrel 14. The movement of the gripper frame continues, however, until the gripper frame is brought adjacent to the rear edge of the paper guide, the springs 49 49 being at this time compressed to permit the gripper frame to approach the paper guide. By this movement of the gripper frame toward the paper guide, which occurs after the paper guide has reached the forward limit of its movement, the end portion of the web is advanced through the paper guide and the end margin thereof is brought into position to be gripped between the mandrel and its clamping member. When the gripper frame begins its rearward movement, it is drawn away from the paper guide, the expansion of the springs 49 49 aiding in the separation of the parts, and said gripping frame and paper guide retain their separated relation during the rearward movement of both parts and until they reach the position shown in Fig. 3. The further rearward movement of the paper guide is then positively arrested by contact of the arms 34 34 thereon with the fixed stops 39 39.

Referring now to the details of construction illustrated in the cutting mechanism, the cutting blade 20 thereof (Fig. 4) is connected by means of two oblique bars 53 53 with a transversely arranged operating lever 54 which is pivoted to one of the standards 21 and has guiding engagement with a vertical slot in the other standard.

The obliquely arranged bars 53 53 are rigidly connected at their meeting ends and are pivoted at a point centrally over the blade, to said lever 54. A contractile coiled spring 55 is connected with the swinging end of said operating lever 54 and with the horizontally extended upper end of the adjacent standard 21, said spring serving to maintain the said operating lever and a cutting blade normally in the elevated position thereof. Mechanism for giving movement to said operating lever 54 will be hereinafter described.

Rotative movement is given to the mandrel shaft 11 and mandrel 14 by driving mechanism embracing a friction clutch, as will be hereinafter described, and the rotation of the mandrel is arrested during the removal of the completed roll therefrom and also during the clamping of the end of the web thereto, by a stop device adapted to hold the mandrel from turning, one of the clutch members being adapted to slip on the other when the mandrel is held from rotation by the stop device, which latter is also involved in the operation of the said clamping member.

Now referring to the details of construction illustrated in the means for arresting the rotation of the mandrel shaft 11, in the clamping member 15 and the devices for actuating said clamping member, the same as shown, are constructed as follows: Attached to the inner end of said mandrel shaft 11 is a collar 56 (Figs. 2 and 9 to 14) provided at its inner end with an annular flange 57. The collar 56 is longitudinally slotted and in the slot thereof is located the inner end of the clamping member 15 which is pivoted to said collar by means of a transverse pivot pin 58. Said clamping member 15 is provided at its inner end, adjacent to the pivot pin 58, with a rigid outward extending arm 59 between which and the face of the collar 57 is located an expansively acting, coiled spring 60 which tends to normally maintain the said clamping member 15 at a distance from the said mandrel 14. A swinging stop arm 61 is mounted on a horizontal rock shaft 62 which extends longitudinally of the machine and is mounted on two brackets 63 63 which are formed on and extended rearwardly from a vertically arranged stop plate 64, which is secured to the inner face of the fixed bearing 12 of the mandrel shaft. The rock shaft 62 is located above the bearing 12 and in such position that the stop arm 61 thereon is adapted to swing in a vertical plane passing through the central axis of the mandrel shaft. The stop plate 64 is provided with a vertical slot 65 extending upwardly from the mandrel shaft and through which the moving end of the stop arm 61 swings or moves when the rock shaft 62 is turned. Said plate 64 has a flat, annular, inner bearing face over which said arm 59 moves in the rotation of the mandrel. The arm 59 is adapted to enter the slot 65 in said stop plate 64 in order to permit the outward movement of the clamping member 15 away from the mandrel and the said stop arm 61 is adapted when swung inwardly and downwardly to act upon said arm 59 so as to throw the clamping member into clamping position against the action of the spring 60. When said stop arm thus operates on the arm 59 it also presses or forces said arm out of the said slot 65, bringing the outer face of said arm into the plane of the annular bearing face of the plate 64. Said arm 59, under the action of the spring 60, bears against the said annular bearing surface, after it leaves the stop arm in the forward rotation of the mandrel; the bearing contact of said arm with said annular face serving to retain the clamping member against the mandrel so far as necessary at the beginning of the winding of the paper on the mandrel. The said stop arm is provided at the top of its end face with a forwardly extending stop lug 66 adapted, when the stop arm is swung to the limit of its downward or inward movement, to stand in the path of the arm 59 of the clamping member and thereby serve as a positive stop by which the rotative movement of the mandrel is arrested upon the completion of a roll, and by which, also, the mandrel is held from turning during the removal of the finished roll therefrom. When said stop arm is thrown to the inward limit of its movement, or into the horizontal position shown in Fig. 12, said stop lug 66 projects into the path of the arm 59 of the clamping member and acts to arrest the turning of the mandrel and when said arm is moved or swung upwardly or outwardly, to carry said stop lug to a position radially outside of the path of said arm 59, the latter is released and permitted to have a slight further advanced movement until it is brought into position opposite said slot 65, which it then enters, thereby permitting the clamping member to swing outwardly or away from the mandrel. The engagement of said arm 59 with the vertical slot 65 not only serves to permit the movement of said clamping member 15 away from the mandrel, but also to hold the mandrel shaft and mandrel in position for the insertion of the end of the web between the mandrel and said clamping member; that is to say, in a position with the clamping member above and in the same vertical plane with the said mandrel. The mandrel is held by the engagement of said arm 59 with the slot 65 in the position last referred to, during the operation of inserting the end of the web between the mandrel and its clamping member and the closing of said clamping member against the mandrel. The said stop arm has an end bearing face for contact with the arm 59, so arranged that when the stop arm is thrown inwardly to force or press the arm 59 out of said slot 65, this being the intermediate position of said stop arm, said end bearing face stands substantially in the same vertical plane with the inner annular bearing face of the plate 65 and is thereby adapted to hold the said arm 59 in position to move along the said annular bearing face of said plate 64. In other words, the said end surface of the stop arm, which latter is equal in width to the width of the slot, forms in effect a part of said annular bearing face of the plate 65 when the stop arm is in its intermediate position. As shown in the drawings, the said plate 64 (Figs. 11, 13 and 15) is provided with a beveled or inclined face 68 at the side of the slot 65 toward which the arm 59 moves in the forward rotation of the mandrel. At the side of the slot at which said beveled surface is located the edge of the latter is somewhat inside of the plane of the annular bearing face, as clearly seen in Fig. 13. This construction is employed in order to insure the passage of the arm 59 from its position in contact with the stop arm 61 at the beginning of the forward turning movement of the mandrel, it being manifest that the end surface of said stop arm 61 cannot project beyond the bearing face of said plate 64, as otherwise it would interfere with the later turning movement of said arm 59, and that the presence of said beveled surface 68 insures the proper operation of the parts notwithstanding the slight inaccuracies of adjustment that may exist. It will be understood that, after the arm 59 has been thrown outwardly from the slot 65 and the clamping member has been brought against the mandrel to clamp the paper thereto, the mandrel will immediately begin to turn for the winding of the paper thereon, and, after one or more wrappings of paper have been applied to the mandrel, the said clamping member will be held or bound to the mandrel by the windings or wrappings of paper thereon, so that the arm 59 will no longer bear against the plate 64 under the action of the spring 60 and the presence of the beveled surface 68 will have no further effect on said arm 59 during the winding operation.

It will be understood from the above that the said stop arm 61 has three positions, to-wit; an extreme lowermost position, in which the stop 66 is effective for arresting the rotation of the mandrel, an extreme uppermost position, permitting the arm 59 to enter the slot in plate 64 in the opening movement of the clamping arm, and an intermediate position in which the end of said arm 59 is brought into the plane of the bearing face of said plate 64.

In connection with the oscillating stop arm 61, operating as described, a driving device is provided for the mandrel shaft 11 embracing a clutch having parts which are in frictional contact with each other and which are adapted to slide one upon the other to permit the stopping of the rotation of said shaft by contact of the arm 59 with the stop lug 66, and also the stopping of the said shaft after the lifting of the said stop lug out of the path of said arm 54, and when said arm 59 has moved through the short distance required for its entrance into the slot 65, when the mandrel is again held from turning until said arm 59 has been pushed out of the slot by the return or downward movement of said stop arm. The driving device for the said mandrel shaft 11 is moreover so constructed as to turn said shaft alternately at high and low speeds, the shaft being turned at high speed at the time the paper is being wound upon the mandrel and at slow speed during the time the paper accumulates in the receptacle 23, this being the period during which the rotation of the mandrel is arrested by the action of the stop lug 66 and the clamp member 15 is opened to receive the paper beneath it and closed to clamp the paper to the mandrel, it being manifestly desirable that the mandrel shaft should turn slowly during these operations in order that its rotative movement may be arrested without undue shock or jar, and have slow movement when the said arm 59 is moved a short distance from the position in which it is arrested by said stop projection 66 to the position in which it enters the slot 65, to permit the opening of the clamp member. As shown in the drawings, said driving device embraces pulleys 70 and 71 rotatively mounted on the shaft 11 and provided with friction disks 72 and 73, and a clutch member 74, located on said shaft between the said pulleys and having endwise sliding splined connection with said shaft. Said clutch member is provided with friction disks 75 76 which operate in connection with the friction disks 72 73 to produce driving connection between one or the other of said pulleys and said shaft when the clutch member is moved on the shaft to bring it in contact with one or the other of said friction disks 72 73. As illustrated, said friction disks 75 and 76 are provided each with a layer of leather or like material on its contact face. The pulleys 70 and 71 are driven in the same direction by means of driving belts 77 and 78 from pulleys 79 and 80 which are mounted on a horizontal shaft 81 mounted transversely of the machine on the lower frame members 4 and 5. Said shaft 81 constitutes the main driving shaft of the machine and may be driven from any suitable source of power. The belt pulley 80 is very much smaller than the belt pulley 79, so that the pulley 71 is driven at a much lower rate of speed than the pulley 70.

Devices are provided for shifting the clutch member 74, so constructed as to hold the friction disk 75 in contact with the friction disk 72 on the fast moving pulley 70 during the period in which the paper is being wound upon the mandrel and to hold said friction disk 76 in contact with the friction disk 73 on the slow moving pulley 71 during the period when the roll is being removed from the mandrel and the end of the paper clamped to the mandrel preparatory to the formation of a new roll. Said actuating devices for the hub 74 embrace a vertically arranged lever 82 mounted between its ends on a horizontal pivot 83. Means for giving movement to said lever 82, and for timing the operation thereof, will be hereinafter described.

As hereinbefore stated, the outer end of the mandrel 14, over which the finished roll of paper is removed, is provided with a movable bearing plate 16.

Referring to the details of construction in connection with said bearing plate, the same has the form of a flat disk provided with a central bearing socket for the end of the mandrel and having a horizontal arm which extends rearwardly therefrom and has pivotal connection with the frame of the machine, permitting said plate to swing outwardly in a horizontal plane. Such pivotal connection, as shown, consists of a hinge 85 connecting the arm on said plate with a supporting block 86 which is attached to the frame piece 1 as clearly seen in Figs. 2 and 8. A spring is applied to hold the said bearing plate 16 yieldingly in position for engagement with the end of the mandrel. Said spring, indicated by 87, is shown as having a coiled portion which surrounds an upright stud 88 on the block 86, and a straight end portion which extends over the top of plate 16 and is secured thereto by a stud or the like. Said bearing plate 16 is adapted to swing horizontally outward when the end of a roll of paper upon the mandrel is thrust endwise against the same; the plate swinging to a position nearly parallel with the axis of the mandrel so as to permit the roll to slide or move past the same, as said roll is thrust endwise from the mandrel.

Now referring to the details of construction illustrated in the devices for removing the finished rolls of paper from the mandrel, the stripper plate 17, which has transverse sliding movement on the rods 19, as hereinbefore described, is adapted, when in its retracted position to rest in contact with the flange 57 of the mandrel collar 56, and said plate 17 is provided with a slot or opening for the passage of the mandrel, said slot extending downwardly from its top surface to the center thereof in order to enable the said plate to be readily engaged with the mandrel in assembling the parts. Said slot or opening is indicated by 90 in Fig. 17. Said stripper plate 17 does not itself have direct bearing engagement or contact with the mandrel, but it is provided with a disk 91 adapted to slide on the mandrel, arranged in the plane of said stripper plate and adapted to turn or rotate thereon. Said disk 91 has a notch or open slot 92 (Fig. 18) extending radially from its center through its outer margin. Said slot has parallel sides and is adapted to fit upon the mandrel, which latter is made flat-sided in order that the said disk 91 may have rotative connection therewith. As illustrated, said disk 91 is held rotatively upon the stripper plate 17 by means of a segmental face-plate 93 which is secured to the inner surface of said plate 17 by screws, and which is undercut or provided with an inclined inner edge which overlaps the correspondingly beveled marginal surface of the said disk 91, as clearly shown in Fig. 12. The bearing face of the said disk 91 is flush with that of the face plate 93, and both said disk and plate are adapted to act upon the end of the roll or bearing in pushing the same from the mandrel.

The construction which embraces the rotative disk 91 as part of the pusher plate insures the proper removal of the roll from the mandrel because the said disk 91 is in close contact with the surface of said mandrel and is therefore in position to act upon the innermost turn of the paper which is in contact with the mandrel, thereby making it certain that such innermost turn of paper will be stripped from the mandrel in the operation of the stripper.

For giving movement to the said stripper plate 17 its supporting block 18 has connected with it an operating chain 94, Fig. 12, which chain extends transversely across the machine frame and engages, at the side of the frame adjacent to the free end of the mandrel, a guide roller 95, Fig. 8, from which said chain passes downwardly to a guide roller 99 mounted on the horizontal frame member 4 at the lower part of the machine frame. From the guide roller 99 the chain 94 extends rearwardly in nearly a horizontal direction to a drum 100 which is mounted on a horizontal shaft 101 extending transversely of the machine frame at the rear of and parallel with the main driving shaft 81 hereinbefore referred to and is mounted in bearings on the lower frame members 4 and 5. Said shaft 101 is provided with a gear wheel 102 intermeshing with a gear wheel 103 on the said shaft 81. The winding drum 100 is, as shown, in Fig. 3, constructed in the form of a snail cam, the spiral peripheral surface of which is of such length as to effect the desired movement of the stripping plate in one, or somewhat less than one, complete rotation of said drum. The gear wheels 102 and 103 are fixed upon the shafts 101 and 81, and the shaft 101 is adapted to move endwise in its bearings to carry the gear wheel 102 laterally into and out of mesh with the gear wheel 103. At its end adjacent to the frame member 5, the said shaft 101 is extended outside of its bearing and the end portion thereof (Fig. 6) is provided with a central extension or stem 104, through which said shaft is connected with operating devices for giving endwise movement thereto, as hereinafter described.

The device described, embracing the drum 100 and chain 94, operates to move the stripper plate 17 in one direction only, or gives to the same its forward movement for removing the roll from the mandrel and the reverse or backward movement of said stripper plate is effected by spring-actuated means which, as shown in the drawing, embraces the following features. 105 indicates a horizontally swinging lever, located below the table 22 and extending in a direction from front to rear of the machine. At its rear end said lever 105 is pivoted to a bracket 106 secured to the forward end wall of the receptacle 23, as clearly seen in Figs. 3 and 7. At its opposite or forward end said lever 105 has bearing engagement with the inner face of the stripper plate 17, the end of the lever being adapted to rest on the top surface of the block 18, and adapted to slide on the vertical inner face of said plate 17, as said end of the lever moves across the machine in its curved path or arc. Between its ends the said lever 105 is provided with a depending arm or bracket 107 to which is attached one end of a contractile coiled spring 108, which extends transversely of the machine and is attached at its opposite end to the longitudinal frame member 2; said spring exerting tension on the lever 105 in a direction to give rearward or retractive movement to the stripper plate 17. The gear wheels 102 and 103 are retained in intermeshing relation during such portion of a rotation of the winding drum 100 as is required for drawing the stripper plate the length of the mandrel, the gears being disconnected and the shaft 101 and drum 100 being released and allowed to turn backwardly under the action of the retracting spring 108, as soon as the stripper plate has reached the limit of its forward movement or has moved far enough to bring the roll into engagement with or under the influence of a delivery carrier belt 112 there located.

At the side of the machine frame adjacent to the free end of the mandrel 14, and exterior to the swinging bearing plate 16, is located a device which operates in conjunction with the stripping mechanism described to remove the finished roll of paper from said mandrel and deliver the same from the machine. The delivery device referred to, shown in Figs. 2 and 8, embraces a traveling, horizontally arranged belt 112, the upper lap of which is located at the level of the bottom of the roll of paper and which is carried by horizontal, parallel supporting rolls 113 114 mounted in horizontal supporting arms 115 which extend outwardly from the frame member 1 at right angles to the said frame member. The supporting roll 113 is located at the inner end of the carrier belt and is mounted on a shaft 116 provided with a belt pulley 117. In the construction illustrated said shaft 116 is driven by means of a belt 118 passing over said pulley 117, over two idlers or guide pulleys 119, 120 (Fig. 3) and over a pulley 121 mounted on the main driving shaft 81 of the machine.

Above the carrier belt 112 of the delivery device is located a presser roll 122, which extends transversely of and above the path of the roll of paper as the same is carried outwardly by said belt. Said roll 122 is journaled in the outer ends of the two swinging arms 123, pivotally connected with the supporting arms 115, so as to permit rising and falling movement in the roller 122. Contractile coiled springs 124, connecting the said arms 123 with the supporting arms 115, serve to draw or press the roll 122 downwardly against the paper roll. The downward movement of said arms 123 is limited by stop pins 125 adapted for contact with said arms 115. Said roll 122 is thereby maintained in position to engage the top surface of the roll of paper when the outer end of the same, as it is carried outwardly by the carrier belt, reaches said presser roll 122.

Attached to the block 18 of the stripper plate is a bracket 126, to which is attached an upwardly extending presser 127 having, as shown in the drawings, the form of a wire loop the ends of which are secured to said bracket 126. The presser 127 is curved to correspond with the curvature of the outer face of the paper roll formed on the mandrel, and is located at a distance from the mandrel equal to the radial thickness of the finished roll of paper, so that it is adapted to bear upon the outer surface of said finished roll when the same is completed. The purpose of said presser is to make certain that the cut-off end of the length of paper on the roll, after the same has been severed from the web by and cutting mechanism (and which is, therefore, loose or free and not under tension) shall be closely wound upon the roll. Said presser, moreover, as it moves endwise with the roll, when the latter is stripped from the mandrel, serves to retain said loose or free end of the paper in contact with the body of the roll while the roll is being stripped from the mandrel and transferred to the delivery device.

Now referring to the means for driving or actuating the several parts of the machine described and for timing the operation of said parts, the machine embraces features of construction as follows:

First, referring to the means for driving or actuating the feed rollers 6 and 7, said feed rollers are driven from the main drive shaft 81. As hereinbefore stated, the shaft 8 of the lower feed roll 6, is provided with a sprocket wheel 9, and said shaft is driven by means of a sprocket chain 127 which engages said sprocket wheel 9 and a sprocket wheel 128 on said shaft 81 as seen in Fig. 3. The sprocket chain 127 is shown as crossed in order to give rotative movement in the feed roller in a direction the reverse to that of the said shaft 81.

For giving movement to, and timing the movement of the several mechanisms described, a main operating or cam shaft 130 is employed, the same being arranged longitudinally of the machine between and parallel with the two lateral frame members 2 and 3. Said shaft 130 is driven from the shaft 8 of the lower feed roller by a worm gear, consisting of a worm 131 on said shaft 8 and a worm wheel 132 on the shaft 130. Said shaft 130 is provided with a plurality of cams, through the medium of which motion is severally given to the clutch devices of the mandrel shaft, the device for actuating the mandrel clamping member, the cutting mechanism, the reciprocating gripping device and the device for actuating the stripper plate.

For operating the upright lever 82 of the friction-clutch mechanism, through which the mandrel is driven, a cam 133 is mounted on the shaft 130 adjacent to said lever 82 (Figs. 1 and 8) and said cam is adapted to act upon the horizontal arm of a bell-crank lever 134 which is pivoted to the machine frame so as to swing in the plane of the cam. Said bell-crank lever 134 has a depending arm, the lower part of which is outwardly deflected (Fig. 8) and bent at its lower end at right angles so as to engage the outer face of the arm 82 (Fig. 19). Between the lower end of said arm 82 and a bracket 135 on the machine frame, is located a coiled, expansively acting spring 136 which acts to throw the lower end of said arm 82 outwardly or in a direction to maintain the clutch member 74 in contact with the fast turning pulley 70 on the mandrel shaft. The said cam 133 is provided with two concentric, peripheral surfaces at different radial distances from its center. The outer peripheral surface or elevated part of the cam extends through about one-fourth of its periphery and acts upon the lever 134, so as to swing the lower end of said lever toward the machine frame, thereby compressing the spring 136 and moving the clutch member 74 in a direction to engage the slow moving pulley 71 on the mandrel shaft. The elevated part of said cam 133 therefore maintains slow rotative movement of the mandrel during a period occupying about one-fourth of a revolution of the shaft 130.

Provision is made for operating the clutch controlling lever 82 not only through the medium of the cam 133, but by other means, as follows: Extending across the receptacle 23 above the web of paper therein is a horizontal trip member 137, preferably consisting of a round rod provided with a surrounding, freely rotating anti-friction roller. Said trip member 137 is attached at its ends to arms 138 138 (Fig. 1) which are rigidly attached to a rock shaft 139, which is mounted in bearings attached to the front wall of the said receptacle 23. On one end of said rock shaft is a rigid, downwardly extending arm 140 to which is connected the rear end of a connecting rod 141 which extends forward from said rock shaft and is connected at its opposite end with a bell-crank lever 142 (Fig. 19), which is mounted on the bracket 135 so as to swing in a horizontal plane. Said bell-crank lever 142 is connected by a rod 143 with the lower end of the clutch controlling lever 82. These parts are so arranged that when the trip member 137, within the receptacle 23, is lifted, the lower end of the clutch operating lever 82 will be thrown inwardly or in a direction to shift the clutch member 74 out of contact with the fast moving pulley 70 into an intermediate position, leaving it free from contact with the slow moving pulley 71 on said shaft. Said vertically moving trip member 137 is located at a considerable distance below the line in which the web of paper would pass if drawn straight from the feed rolls to the paper table 28, and it follows that when all of the paper accumulated in the said receptacle 23 has been withdrawn therefrom by the action of the mandrel, the part of the web within the receptacle will rise into contact with the said rod 137 and, being tightened against the same when the slack is taken out of the paper, said rod will be lifted with the effect of disconnecting the mandrel shaft from the fast moving driving pulley thereon. It follows that as soon as all of the paper accumulated loosely in the receptacle 23 has been withdrawn from the same, said clutch member will be disconnected from the fast moving pulley of the mandrel shaft and the mandrel will then continue to turn as fast only as permitted by the feeding of the paper under the action of the feed rolls. The controlling device described, which is operated automatically upon the exhaustion of the paper loosely accumulated in the receptacle 23, is designed to insure the cessation of the rapid winding action of the mandrel as soon as the paper so accumulated shall have been withdrawn from the said receptacle.

Next referring to a means for operating, and controlling the operation of, the rock shaft 62, which operates the devices for arresting the rotation of the mandrel and actuating the clamping member thereof, the same are constructed as follows: On the said shaft 130 is a cam 144 (Fig. 5) and pivotally mounted on the outer frame member is a vertically swinging lever 145 which is connected at its inner or swinging end by a link 146 with a rigid arm 147 on the rear end of said rock shaft 62. Said lever 145 is provided with a rigid depending arm 148 provided at its lower end with an anti-friction roller and engaging the periphery of the cam 144. Said lever 145 is yieldingly held in its depressed position and the arm 148 maintained in engagement with said cam 144 by means of a contractile coiled spring 149 connected at its ends with said lever 145 and with the part of the frame below the same, as seen in Figs. 1 and 5. Said cam 144 is provided with two elevated parts or projections 150 and 151, of which the projection 150 gives to the lever 145 and the rock shaft 62 a greater extent of movement than the projection 151. These parts are so arranged that, during the greater part of the revolution of the cam 144, the lever 145 will be depressed to a maximum extent and the stop arm 61 on said rock-shaft 62 will be held in its raised or retracted position, permitting the arm 59 to enter the slot 65 in the stop plate 64. When, in the turning of said cam, the lifting part 150 reaches the arm 148, the lever 145 will be lifted to its maximum extent, with the result of swinging the stop arm 61 to its lowermost position and bringing the stop 66 thereon in the path of the arm 59 so as to arrest the rotation of the mandrel. The cam projections 150 and 151 being angularly separated from each other, when the projection 150 passes the arm 148, the lever 145 drops abruptly, so that the stop arm 61 will be swung upwardly and out of the slot 65 of the plate 64, and the arm 59 thereby permitted to move until it reaches and enters said slot, and thereby stops the mandrel a second time. The cam projection 150 is of such length circumferentially as to afford sufficient time between the first stoppage of the mandrel and its subsequent release for the removal of the finished roll from said mandrel. The distance between the said cam projections 150 and 151 circumferentially of the cam is considerable so that the projection 151 does not operate the stop arm 61, and the latter remains retracted until ample time has been given for the introduction of the end of the web between the mandrel and the clamping arm 15. As soon as this is accomplished, the said cam projection 151 moves the lever 145 to an extent sufficient to swing the stop arm 61 to its intermediate position, with the effect of releasing the arm 59 from the slot 65 and permitting the turning of the mandrel, through the action of the friction drive, to wind the paper on said mandrel to form the roll. After the arm 59 has been so released, and the first turn of the mandrel effected, the cam arm 61 may again be swung upwardly, because the clamping arm 15 will be then held against the mandrel by the winding of the paper outside of it, and the said projection 151 is therefore made relatively short permitting such retraction of the stop arm 61 to take place soon after the mandrel begins its rotative movement.

Now referring to the means for operating the cutting device, the same is shown in Fig. 4 and embraces features as follows: 155 indicates a cam on the shaft 130 having the form of what is known as a snail cam, same being provided with a radial shoulder and a spiral peripheral margin extending from the inner to the outer end of said shoulder. Above said cam 155, in the same vertical plane therewith, is a swinging lever 154, pivoted at its outer end to the frame member 3 and having its inner end located vertically beneath the swinging end of the operating lever 54 of the cutting mechanism. The lever 154 is provided with a rigid depending arm 156 having at its lower end an anti-friction roller which acts on the periphery of the cam 155. A contractile, coiled spring 157, connecting the swinging end of the lever 154 with the machine frame, at a point below the said lever, holds said arm 156 in engagement with the said cam. Pivotally mounted on the swinging end of the operating lever 54 is a depending latch bar 158, arranged in the plane of the lever 154 and extending at its lower end past or below said lever, which latter is provided with a longitudinal slot or notch affording guiding engagement of said lever with said latch bar. In the outer edge of said latch bar 158 are formed two notches the lower margins of which constitute upwardly facing shoulders 160 and 161, and said latch bar is held or pressed by a spring 159, attached to the lever 54 and pressing outwardly on said bar, toward the said lever. The outer margin of the latch bar is thereby held yieldingly in contact with the inner edge of the guiding notch in said lever. The upper, upwardly facing shoulder 160 is adapted for engagement with the lever 154 while the like lower shoulder 161 is adapted for engagement with a fixed, horizontal, stop-plate 162 attached to the machine frame and slotted to receive said bar.

The operating arm 154, with the latch bar 158, is held in its elevated position by the spring 55, and the upward movement of said latch bar is limited by contact of its shoulder 161 with the said stop-plate 162. The upward swinging movement given to said lever 154 by the action of the cam 155 is sufficient to carry the moving end of said lever above the shoulder 160 of the latch bar 158, and into position to engage said shoulder. The said lever 154, in its upward movement, presses the latch bar 158 backwardly against the action of the spring 159, and said spring forces the bar forward, so as to bring its shoulder 160 in engagement with said lever, as soon as the end of the lever passes above the said shoulder. When, in the turning of the cam 155, the abrupt or radial margin thereof passes the arm 156 the lever 154 is allowed to suddenly drop, being thrown downwardly by the spring 157, (which is stronger than the spring 55) and the bar 158 is thereby carried downwardly with the effect of depressing the operating lever 54 and carrying the cutting blade 20 through the slot in the table 22, so that the paper is quickly or instantly severed. When the lever 154 reaches its horizontal position, the edge of the latch bar 158, below the shoulder 160, acts on the end of the slot in the stop plate 162, so that the said bar is swung rearwardly by said stop plate, and when the said lever reaches its horizontal position said latch bar will have been swung so far rearwardly as to release the said shoulder 160 from the lever and permit the cutting blade to quickly rise under the action of the spring 55. Said cam 155 and the cam 133, which controls the speed of the mandrel, will be so arranged on the shaft 130 that the mandrel will begin to turn at slow speed immediately before the operation of severing the paper takes place; the cutting device being operated and the shifting of the clutch member 74 to engagement with the slow turning pulley on the mandrel shaft taking place at a sufficient interval of time before the mandrel is stopped by the action of the stop arm 61 (operated by the cam 144) to insure the winding upon the mandrel of the length of paper left between the cutting blade and the mandrel before such stoppage of the mandrel takes place.

Now referring to the mechanism for giving motion to the paper guide 26 and the gripper frame 32, it has been hereinbefore stated that these parts are given motion through the medium of a horizontal and longitudinally sliding head 40 attached to an endwise sliding rod 42 located at the center of the machine and engaged with a horizontal swinging operating arm 45. For giving oscillatory motion to said arm 45 a cam 166 is mounted on the shaft 130, the side face of said cam being adapted for contact with a roller 164 mounted on a horizontal arm 165 which is attached to said lever 45 and extends toward said cam. Said cam 166, as clearly seen in Fig. 7, is provided with a laterally extending cam projection 167, which is so shaped as to at first give a short advance movement to the gripper frame and then move the same rapidly to the forward limit of its movement and backwards to its starting point. Said roller 164 is held in contact with the cam, and the retractive movement of the parts is effected by the action of the contractile spring 48, while undue shock or jar on the parts when the roller 164 drops over the abrupt edge of the cam projection 167, is prevented by the action of the expansively acting spring 47.

Now referring to the devices through the medium of which the stripper plate 17 is actuated to effect the removal of the finished roll from the mandrel, said devices are adapted to act upon the endwise movable shaft 101 on which is mounted the shifting gear wheel 102. As hereinbefore described said devices embrace a substantially upright lever 170, arranged in a vertical plane passing through the central axis of the shaft 101, and loosely connected at its lower end with a bracket 171, on the lower frame member 5, by means of a link 172 pivoted at its ends by horizontal pivots to said bracket 171 and to the lower end of said lever 170. Said lever is provided with a longitudinal slot 173 through which passes the stem 104 on the end of the shaft 101, said stem having a head which engages the outer face of the lever, so that lateral swinging movement of the lower end of said lever 170 will give endwise movement to said shaft 101. Said lever 170 is connected at its upper end with a horizontally arranged lever 175 which extends transversely of the machine frame and is pivotally connected at its outer end with the frame member 3 so that its inner end may swing in a vertical plane. The inner end of said lever 175 is pivoted to the upper end of the lever 170, and by means of a cam 177 on the cam shaft 130, is given rising and falling movement, by which corresponding movement is imparted to the lever 170 and to the outer end of the link 172, which latter as it swings about its pivoted connection with the bracket 171, gives movement to the lower end of said lever 175 in a curved path, whereby said lower end of the lever is moved laterally in a manner to give endwise movement to the shaft 101. The cam 177 is mounted on the shaft 130 beneath and in the same plane with the swinging lever 175, and the latter is provided with a rigid depending arm 176 which bears on the periphery of the cam 177. The said arm 176 is held in contact with the periphery of the cam 177 and the lever 170 held yieldingly at the lower limit of its movement with the link 172 in a downwardly inclined position, by means of a contractile coiled spring 178 connected with an outwardly projecting stud on the lower end of said lever 170 and with the bracket 171 at a point below said stud. Said cam 177 has a circular, peripheral bearing surface extending nearly around the same but interrupted at one point by a V-shaped depression which permits a quick lowering of the lever 175 followed by a quick return thereof. Such movement of the lever 175 results in the shaft 101 being thrust inwardly to bring the gear wheel 102 into mesh with the gear wheel 103, during the short period of time required for winding the chain 94 on the drum 100. During the period of engagement of the gear wheel 102 and 103, the stripper plate is moved lengthwise of the mandrel to thrust the finished roll from the same and into engagement with the delivery mechanism, as hereinbefore described. As soon as the stripper plate has completed its advance movement, the cam lifts the levers 175 and 170 so as to restore the shaft 101 to its original position and disconnect the said gears from each other, whereupon the stripper plate is released from the influence of the driving shaft, and is returned to its starting point by the action of the spring 108; the drum 100 and its shaft 101 turning backward as the chain is drawn from the drum in the backward movement of the stripper plate.

The several cams 133, 144, 155, 166 and 177 on the shaft 130 are so arranged or adjusted on said shaft as to give movement to the several operating devices actuated or controlled thereby in the order and at the times required to effect one complete cycle of operations during each complete rotation of said shaft. To describe generally the operation of the machine, beginning with the insertion of the cut-off end of the web between the mandrel and its clamping member 15, it will be understood that such cut-off end of the web will be inserted at the time the paper guide 26 is in the position shown in Fig. 21, with its forward end adjacent to the mandrel, and that the gripper frame has at this time advanced into contact with the rear end of the paper guide in order to effect the movement of the web forwardly through said paper guide and to bring the extremity of the web outwardly past the front edge of the guide into position between the mandrel and said clamping member. As soon as the gripper frame has completed its forward movement, the cam 144 reaches the position in which the projection 151 thereon swings the rock shaft 62 so as to depress the stop arm 61 and swing the same to its intermediate position, by which the arm 59 on the clamping member 15 is thrown out of the slot in the plate 64 and the said clamping member is closed against the mandrel. As soon as this occurs the mandrel shaft and mandrel begin to turn; the said mandrel shaft at this time being under the influence of the slowly turning pulley 71, which at this time has frictional engagement with the shifting clutch member 74. The projection on the cam 133, by which the clutch is operated, is so arranged that immediately after the stop arm 61 of the operating device for the clamping member has been thrown into its intermediate position and the paper thereby clamped to the mandrel, the clutch member 74 is shifted so as to engage the fast turning pulley 70 with the mandrel shaft and give rapid rotation to the mandrel for winding the paper thereon.

As hereinbefore stated, the feed rolls 6 and 7 are kept in continuous rotation during the operation of the machine and it follows that during the time that the mandrel is turning with a slow movement and while the operations of cutting off the paper, removing the finished roll from the mandrel and gripping the same upon the mandrel are taking place, the portion of the web between the gripping device and the feed roll is accumulating in the receptacle 23. After the end of the web has been clamped to the mandrel the rotation of the mandrel winds upon the same a sufficient yardage of paper to form a roll of the desired size, it being understood that the mandrel during the period of its rapid rotation draws the paper from the receptacle 23 much more rapidly than it is fed thereto by the feed rolls. The relative speeds of the mandrel and of the feed rollers during the formation of the roll is such that the supply of paper loosely accumulated in the receptacle 23 is substantially exhausted in the formation of a single roll. When all of the paper is drawn from the said receptacle the web is tightened against the trip member 137 and, by the operation of said trip member, the clutch member 74 is released from the fast turning pulley 70 and the mandrel then continues to turn as fast only as required to take up the paper advanced by the feed rolls. The cam 133, which controls the clutch device on the mandrel shaft, thereafter reaches a point in its rotation at which the elevated or outwardly extending part thereof comes in contact with the bell-crank lever 134, so as to swing the latter and operate the actuating arm 82. The clutch member 74 is thereby thrown into contact with the slow turning pulley 71.

Immediately following the cessation of the rapid rotation of the mandrel and the consequent almost total stoppage of the movement of the web, the cam 166 comes into operation to first operate the gripping fingers 33 to grip the paper against the bottom plate 30 of the gripper frame. The cam projection 167 on said cam, as clearly shown in Fig. 7, has a part which is slightly raised from the side face of the cam and which gives a short forward movement to the head 40 and arms 41, 41, and thereby effects the operation of the gripping fingers without moving the gripper frame. After the paper is gripped by said gripping fingers, the rotation of the cam 155 of the cutting mechanism brings the upright shoulder of said cam into position to release the arm 154 of said mechanism, with the result that the cutting blade is quickly depressed and immediately permitted to rise, as hereinbefore described. The paper is thereby severed at a point in advance of the paper guide 26. After the paper is severed by the action of the cutting blade the mandrel still continues in rotation at its slow speed, thereby completing the roll by the winding thereon of the end portion of the paper left between the mandrel and the cutting device. The cams 133 and 144 are so arranged on the shaft that, after such slow turning movement of the mandrel has continued a sufficient length of time to wind upon the mandrel the loose end of the paper, as described, the turning of the cam 144 brings the higher cam projection 150 thereon into action, so as to swing the stop lug 66 on the stop arm 61 into the path of the arm 59 of the mandrel clamping member, so that the rotation of the mandrel is arrested when the said clamping member 15 stands above the mandrel and in position for the introduction of the extremity of the web beneath the same. It will, of course, be understood that the cams 133 and 144 are so arranged that the slow turning movement of the mandrel begins a sufficient length of time in advance of the action of the elevated part 150 on the cam 144, by which the mandrel is positively stopped, to insure that the loose end of the paper, between the mandrel and the cutting knife, shall be wound on the roll and the latter thereby completed before the rotation of the roll is arrested. Immediately after the completion of the roll and the stoppage of the mandrel by the action of the stop lug 66, the turning of the cam 177 brings the notch or depression therein in position to shift the shaft 101 endwise and to thereby effect the rotation of the drum 100 required for moving the stripper plate 17 endwise of the mandrel; or, in other words to effect the advance and retraction of the said stripper plate, such advance and retraction of the stripper plate occurring while the arm 148 of the cam 144 is acting on the elevated part 150 of said cam 144, and the mandrel is thereby positively held from rotation. Although the clutch member 74 is at this time in contact with the slow turning pulley 71, the belt 78 slips upon the said slow turning pulley during the time the mandrel is so positively held from rotation. After the operation of the stripping plate, the arm 148 drops over the upright shoulder at the end of the projection 150 on the cam 144, thereby permitting the stop arm 61 to swing upwardly to its retracted position, and permitting the turning of the mandrel shaft the short distance required to bring the arm 59 opposite the slot 65 in the plate 64, thereby permitting the opening of the mandrel clamping member.

After the completion of the movement of the cutting blade, the cam projection on the cam 166 gives further movement of the rods 41, 41 and thereby advances the gripper frame and with it the paper guide which, as before stated, is held normally at a distance from the paper guide by the action of the springs 49, 49. The action of the cam 166 continues until the paper guide reaches the forward limit of the movement, with its forward edge adjacent to the mandrel, as indicated in Fig. 21. When the forward movement of the paper guide is arrested by contact of its arms 34 with the standards 21, 21 of the cutting device, the forward movement of the gripper frame continues, so as to advance the end portion of the web through the paper guide, the forward edge of the web being thereby advanced between the mandrel and the clamping arm. The cams 166 and 144 are relatively so arranged that the gripper frame completes its forward movement, to carry the end of the web between the mandrel and its clamping member, just after the latter has been permitted to open by the retraction of the stop arm 61 and the entrance of the arm 59 into the slot 65, affected through the action of the cam 144. The distance between the projections 150 and 151 on said cam 144 is sufficient to give time for the operation of the cam 166 in advancing the gripper frame and paper guide and the thrusting of the paper outward from the paper guide and beneath the mandrel clamping member, before said projection 151 acts upon the lever 145 to swing the stop arm 61 to its intermediate position with the effect of closing the clamping member against the mandrel and releasing the arm 59 from the slot 65 in the plate 64, thereby leaving the latter free to turn under the action of the slow turning pulley 71. As soon as the end of the web is clamped to the mandrel the cam 166 permits the retraction of the gripping device and paper guide under the action of the retracting spring 48. Immediately after the mandrel so begins its slow rotative movement, the elevated part of the clutch-operating cam 133 passes away from the arm of the bell-crank lever 134, thus permitting the actuating arm 82 to be swung by its actuating spring 136, in a direction to carry the clutch member 74 into contact with the fast moving pulley 70. The rapid rotation of the mandrel then continues until the completion of another roll, in the manner herein-before described.

It is to be understood that the trip member 137 and the parts operated thereby constitutes a means for automatically controlling the speed of rotation of the mandrel during the winding operation so that the paper is wound on said mandrel rapidly while the paper which has been accumulated in the receptacle 23 is being taken up, but after this has occurred the rapid turning of the mandrel will cease and it will revolve at a speed determined by the rate at which the paper is advanced by the feed rolls, through the action of the cam 133, the friction clutch member 74 is shifted into contact with the slow turning pulley on the mandrel shaft preceding the operation of the gripping and severing devices by which the web is gripped and severed preparatory to the discharge of the finished roll and the formation of a new one.

The length of the strip or piece of paper wound upon the mandrel to constitute a single roll in the machine described is manifestly determined by the quantity of paper fed to the receptacle 23 by the feed rolls during the time occupied in the operations of severing the paper, completing the winding of the roll, removing the finished roll from the mandrel, clamping the end of the web to the mandrel and winding the paper on the mandrel for a succeeding roll, and such length is determined by relative speed of the feed rolls and the shaft 130 on which is mounted the cams for controlling the operation of the several parts. In other words, all of the above mentioned operations are performed during the single rotation of said shaft 130, and the worm gear by which said shaft 130 is driven from the shaft of the lower feed roll is so proportioned that said lower feed roll will have a periphery speed sufficient to feed to the machine a portion of the web of desired length at each complete rotation of said shaft 130. Assuming that rolls of wall paper as ordinarily prepared for the market, each contain sixteen yards, the feed rolls will be arranged to feed sixteen yards of paper to the machine during one rotation of said shaft 130, or during each complete cycle of operations taking place in the machine. The machine illustrated is adapted to form rolls each containing sixteen yards of paper, and known in the market as "double" rolls, and the term "single roll" as hereinbefore used, is intended to mean one of the rolls prepared by the use of the machine, whether the same contains such yardage of paper as to constitute what is known in the trade as a "single" or a "double" roll.

A machine embracing the general features of construction set forth may be variously modified with respect to details of construction and mechanism and I do not desire to be limited to the details illustrated in the accompanying drawings, except so far as the same may be set forth in the appended claims.

I claim as my invention:

1. A machine for the purpose set forth comprising continuously rotating feed rolls adapted to feed a web of paper continuously to the machine, means for severing lengths of paper from said web and means for winding said lengths of paper to form separate rolls, comprising an intermittingly rotating mandrel which, during its turning movements, winds the paper more rapidly than the web is delivered to the machine by the feed rolls, and thereby takes up the slack which accumulates in the intervals between such turning movements of said mandrel.

2. A machine for the purpose set forth comprising continuously rotating feed rolls adapted to feed a web of paper continuously to the machine, means for severing lengths of paper from the web, means for gripping the severed end of the web, and means for winding the severed lengths of paper to form separate rolls comprising an intermittingly rotating mandrel which, in its turning movements, winds the paper faster than the web is fed to the machine by the feed rolls.

3. A machine for the purpose set forth comprising continuously rotating feed rolls adapted to feed a web of paper continuously to the machine, means for severing lengths of paper from the web, an intermittingly rotating mandrel which, in its turning movements winds the paper more rapidly than the web is fed to the machine by said feed rolls, means separate from the feed rolls for advancing the severed end of the web in position to be clamped upon the mandrel, and means for clamping the end of the web to the mandrel.

4. A machine for the purpose set forth comprising continuously rotating feed rolls adapted to feed a web of paper continuously to the machine, means for severing lengths of paper from said web, means for gripping the severed end of the web, an intermittingly rotating mandrel which, in its turning movements, winds the paper more rapidly than it is fed to the machine by the said feed rolls, means for clamping the end of the web to the mandrel, and means separate from the feed rolls for advancing the severed end of the web in position to be clamped upon the mandrel.

5. A machine for the purpose set forth comprising continuously rotating feed rolls adapted to feed a web of paper continuously to the machine, means for severing lengths of paper from the said web, means for winding the severed lengths of paper to form separate rolls embracing an intermittingly rotating mandrel, and a continuously rotating shaft through which the turning movements of the mandrel are controlled, said shaft having positive geared connection with the feed rolls.

6. A machine for the purpose set forth comprising continuously rotating feed rolls adapted to feed a web of paper continuously to the machine, means for severing lengths of paper from the web, an intermittingly rotating mandrel on which the severed lengths of paper are wound to form separate rolls, means for clamping the severed end of the web to the mandrel and means for actuating said severing and clamping means embracing a continuously rotating shaft having positive geared connection with the feed rolls.

7. A machine for the purpose set forth, comprising continuously rotating feed rolls adapted to feed a web of paper continuously to the machine, means for severing lengths of paper from the web, an intermittingly rotating mandrel on which the severed lengths of paper are wound to form separate rolls, means for clamping the severed end of the web to the mandrel, means for advancing the severed end of the web in position to be clamped upon the mandrel, and means for operating said severing, clamping and advancing means embracing a continuously rotating shaft having positive geared connection with the feed rolls.

8. A machine for the purpose set forth comprising continuously rotating feed rolls adapted to feed a web of paper continuously to the machine, means for severing lengths of paper from the web, an intermittingly rotating mandrel on which the several lengths of paper are wound to form separate rolls, and means for controlling the rotative movements of the mandrel embracing a cam and a continuously rotating shaft on which said cam is mounted, said shaft having positive geared connection with the feed rolls and making one complete rotation during the formation of each roll.

9. A machine for the purpose set forth comprising continuously rotating feed rolls for feeding a continuous web of paper to the machine, an intermittingly rotating mandrel on which the lengths of paper are wound to form separate rolls, means for driving said mandrel comprising a friction clutch and means for operating said clutch to control the rotative movements of the mandrel comprising a rotative shaft having positive geared connection with the feed rolls and which makes one complete rotation during the formation of each roll.

10. A machine for the purpose set forth, comprising continuously rotating feed rolls for feeding a continuous web of paper to the machine, means for severing lengths of paper from the web, an intermittingly rotating mandrel on which the severed lengths of paper are wound to form separate rolls, means for driving said mandrel, comprising a friction clutch, and means for operating said severing means and the friction clutch embracing a rotative shaft having positive geared connection with the feed rolls and which makes one complete rotation during the formation of each separate roll.

11. A machine for the purpose set forth, comprising continuously rotating feed rolls for feeding a continuous web of paper to the machine, means for severing lengths of paper from the web, an intermittingly rotating mandrel on which the severed lengths of paper are wound to form separate rolls, means for clamping the end of the web to the mandrel, means for advancing the severed end of the web into position to be clamped upon the mandrel, means for driving said mandrel, embracing a friction clutch, and mechanism for actuating said clamping means and said means for advancing the severed end of the web and for operating said friction clutch, embracing a rotative shaft which has positive geared connection with the feed rolls and which makes one complete rotation during the formation of each separate roll.

12. A machine for the purpose set forth, comprising continuously rotating feed rolls adapted to feed a web of paper continuously to the machine, means for severing lengths of paper from the web, an intermittingly rotating mandrel which winds the paper more rapidly than the web is delivered to the machine by said feed rolls, and a paper receptacle located between the mandrel and the feed rolls.

13. A machine for the purpose set forth, comprising continuously rotating feed rolls, an intermittingly rotating mandrel, means for severing lengths of paper from a web fed to the machine by said feed rolls, clamping means for securing the end of the web to the mandrel, means for advancing the severed end of the web into position for engagement with the clamping means on the mandrel and a paper receptacle located between the said advancing means and feed rolls.

14. A machine for the purpose set forth, comprising continuously rotating feed rolls, an intermittingly rotating mandrel, means for severing lengths of paper from a continuous web fed to the machine by said feed rolls, gripping means for holding the severed end of the web and a paper receptacle located between said gripping means and the feed rolls.

15. A machine for the purpose set forth comprising continuously rotating feed rolls, an intermittingly rotating mandrel, clamping means for securing the end of a web of paper to said mandrel, means for severing the lengths of paper from said web, means for advancing the severed end of the web into a position to be clamped upon the mandrel, and a reciprocating stripper, moving endwise of the mandrel, for removing the finished rolls therefrom.

16. A machine for the purpose set forth comprising continuously rotating feed rolls, an intermittingly rotating mandrel, clamping means for securing the end of the web of paper to said mandrel, means for severing the lengths of paper from said web, means for advancing the severed end of the web in a position to be clamped upon the mandrel, a reciprocating stripper moving endwise of the mandrel for removing the finished rolls therefrom, and means for delivering the rolls from the machine, embracing a traveling belt located in position to receive the finished rolls from the mandrel.

17. A machine for the purpose set forth comprising continuously rotating feed rolls, an intermittingly rotating mandrel, mechanism for clamping the end of the web to the mandrel, mechanism for severing lengths of paper from the web, mechanism for advancing the severed end of the web into position to be clamped to the mandrel, mechanism for removing the completed rolls from the mandrel, and means for operating said several mechanisms comprising a rotative shaft having positive geared connection with the feed rolls adapted to operate said several mechanisms during each complete rotation thereof.

18. A machine for the purpose set forth comprising continuously rotating feed rolls, an intermittingly rotating mandrel, cutting mechanism for severing lengths of paper from a continuous web, mechanism for clamping the end of the web to the mandrel, mechanism for advancing the severed end of the web into position to be clamped to the mandrel, and means for operating said several mechanisms embracing a rotative shaft provided with a plurality of cams by which said mechanisms are severally operated.

19. A machine for the purpose set forth, comprising continuously rotating feed rolls, an intermittingly rotating mandrel, cutting mechanism for severing lengths of paper from a continuous web, mechanism for clamping the end of the web to the mandrel, mechanism for advancing the severed end of the web into position to be clamped to the mandrel mechanism for removing the completed rolls from the mandrel, and means for operating said several mechanisms comprising a rotative shaft having positive geared connection with the feed roll and provided with a plurality of cams by which the said mechanisms are severally operated.

20. A machine for the purpose set forth comprising continuously rotating feed rolls, an intermittingly rotating mandrel, a clamping member on the mandrel, means for severing lengths of paper from a continuous web of paper, means for advancing the severed end of the web between the mandrel and the clamping member, driving means for the mandrel embracing a friction clutch, and means for arresting the rotative movement of the mandrel when the same is in position for the insertion of the end of the web between the said mandrel and clamping member.

21. A machine for the purpose set forth, comprising continuously rotating feed rolls, an intermittingly rotating mandrel, a clamping member for securing the end of the web of paper to the mandrel, means for severing lengths of paper from the web, means for advancing the severed end of the web into position between the mandrel and said clamping member, driving means for the mandrel embracing a friction clutch, means for arresting the rotative movement of the mandrel when the same is in position for the insertion of the end of the web between the mandrel and said clamping member, and means for operating said clamping member to separate it from and bring it into clamping engagement with said mandrel.

22. A machine for the purpose set forth comprising continuously rotating feed rolls, an intermittingly rotating mandrel, a clamping member on the mandrel, means for severing lengths of paper from a continuous web, means for advancing the severed end of the web between the mandrel and said clamping member, means for giving rotative movement to the mandrel, embracing a friction clutch, and mechanism for operating said friction clutch to stop and start the mandrel, said mechanism including a movable stop for arresting the rotative movement of the mandrel when the same is in position for the entrance of the end of the web between the same and said clamping member.

23. A machine for the purpose set forth comprising continuously rotating feed rolls, an intermittingly rotating mandrel, a clamping member carried by the mandrel, mechanism for severing lengths of paper from a continuous web, mechanism for advancing the severed end of the web into position to be clamped to the mandrel, mechanism for actuating said clamping member, driving mechanism for the mandrel including a friction clutch, mechanism for arresting the rotative movement of the mandrel when the same is in position for the entrance of the end of the web of paper between said mandrel and the said clamping member, including a movable stop and means for actuating said several mechanisms embracing a rotative shaft having positive geared connection with the feed rolls and constructed to operate all of said mechanisms during each complete rotation of the said shaft.

24. A machine for the purpose set forth comprising continuously rotating feed rolls, an intermittingly rotating mandrel, a clamping member on said mandrel, mechanism for severing lengths of paper from a continuous web, mechanism for advancing the severed end of the web into position to be clamped to the mandrel, mechanism for actuating said clamping member, driving mechanism for the mandrel including a friction clutch, mechanism for arresting the rotative movement of the mandrel when the same is in position for the entrance of the end of the web of paper between said mandrel and the said clamping member, including a movable stop, and means for actuating said several mechanisms embracing a rotative shaft having geared connection with the feed rolls and provided with a plurality of cams constructed to operate all of said mechanisms during each complete rotation of the said shaft.

25. A machine for the purpose set forth comprising continuously rotating feed rolls, an intermittingly rotating mandrel, driving mechanism for the mandrel, and means for disconnecting the mandrel from its driving mechanism embracing a trip member adapted to be acted on by the web of paper when drawn taut between the mandrel and feed rolls.

26. A machine for the purpose set forth, comprising continuously rotating feed rolls, an intermittingly rotating mandrel, driving mechanism for the mandrel embracing a friction clutch and means for operating said clutch to disconnect the mandrel from its said driving mechanism, embracing a trip member adapted to be acted upon by the web of paper when drawn taut between the mandrel and feed rolls.

27. In a machine for the purpose set forth, the combination of an intermittingly rotating mandrel, a mandrel shaft, driving means for the shaft including a friction clutch, a clamping member pivoted at one end to the mandrel shaft and provided with a rigid outwardly extending arm, a spring applied to throw the said clamping member away from the mandrel, and an oscillating stop arm adapted to be thrown into the path of the said operating arm to arrest the rotative movement of the mandrel and to act on said operating arm to close the clamping member against the mandrel.

28. In a machine for the purpose set forth, the combination of a rotative mandrel, a mandrel shaft, a driving means for said shaft embracing a friction clutch, a clamping member pivoted to the mandrel shaft and provided with a rigid arm extending outwardly therefrom, a spring acting on said clamping member to throw the same away from the mandrel, a stationary stop plate provided with a vertical slot, a stop arm having oscillatory movement in said slot and adapted to be shifted into three positions, namely, to a position in which it projects beyond the bearing face of said plate to arrest the turning movement of the mandrel, to a retracted position for permitting the said clamping member to open and for locking the mandrel from rotation, and to an intermediate position for closing the clamping member against the mandrel and permitting the mandrel to resume its rotative movement, and means for actuating said stop arm to throw the same to the three positions named.

29. In a machine for the purpose set forth, the combination with a rotating mandrel, a mandrel shaft, a clamping member pivoted at one end to the mandrel shaft and provided with outwardly extending rigid arm, driving means for the mandrel shaft including a friction clutch, a stationary stop plate having a vertical slot, a spring acting on said clamping member to hold the same in its open position, an oscillating stop arm adapted to act on said rigid arm of the clamping member and means for actuating said stop including a rotative cam, said cam being constructed to throw said stop arm into the path of the clamping member, for arresting the rotative movement of the mandrel, to withdraw said stop arm rearwardly from the bearing face of said stop plate so as to permit the clamping member arm to enter the said slot in the said plate under the action of said spring, and to advance said stop arm so as to force said clamping member out of locking engagement with the slot, with the effect of closing the clamping member against the mandrel and permitting the mandrel to rotate under the action of its driving devices.

30. In a machine for the purpose set forth, the combination of an intermittingly rotating mandrel, a clamping member carried thereby, driving means for the mandrel embracing fast and slow turning pulleys and a friction clutch between the mandrel shaft and said pulleys embracing a movable clutch member, the shifting of which gives either fast or slow movement of the mandrel, and means for positively arresting the rotative movement of the mandrel and for opening and closing the said clamping member adapted for operation during the period in which the mandrel is driven from the slowly rotating pulley.

31. In a machine for the purpose set forth, the combination of continuously rotating feed rolls, an intermittingly rotating mandrel, a stripper plate moving endwise of the said mandrel and means for operating said stripper plate giving movement thereto in the intervals between the turning movements of the mandrel.

32. In a machine for the purpose set forth, the combination of continuously rotating feed rolls, an intermittingly rotating mandrel, a stripper plate movable endwise of the mandrel, means for giving movement to said stripper plate comprising a retracting spring, a chain connected with said stripper plate, guide pulleys for said chain, a drum on which the chain is wound and intermittingly acting driving mechanism giving rotative motion to said drum for advancing the stripper plate.

33. In a machine for the purpose set forth, the combination of continuously rotating feed rolls, an intermittingly rotating mandrel, a stripper plate movable endwise of the mandrel, means for advancing the stripper plate comprising a chain connected therewith, a rotative drum, driving means for said drum including separable gears, means for disconnecting the said gears comprising a rotative cam and a retracting spring giving return movement to said stripper plate.

34. In a machine for the purpose set forth, the combination of an intermittingly rotating mandrel, a stripper plate, means for giving advance movement to said stripper plate comprising a chain, a drum on which said chain is wound, an endwise movable shaft on which said drum is mounted, a driving shaft, gear-wheels on said driving shaft and drum shaft, an upright lever having endwise sliding engagement with one end of said drum shaft, a link connecting the lower end of said lever with the machine frame, a horizontal lever pivoted to the machine frame and connected with the upper end of said upright lever, and a rotative cam located below said horizontal lever and acting thereon to give rising and falling movement to said upright lever.

35. In a machine for the purpose set forth, the combination of an intermittingly rotating mandrel, a stripper plate movable endwise of the mandrel, means for positive advance movement to said stripper plate and means for retracting the stripper plate, comprising a horizontally swinging lever pivotally supported at one end and bearing at its opposite end against the stripper plate, and a spring acting on said lever in a direction to give retractive movement to the stripper plate.

36. In a machine for the purpose set forth, the combination of an intermittingly rotating mandrel provided with a pivoted clamping member, a stripper plate movable endwise of the mandrel, and a disk mounted to turn freely in said stripper plate and having an open notch to receive said mandrel, said disk being adapted to slide endwise upon and to turn with the mandrel.

37. In a machine for the purpose set forth, the combination of an intermittingly rotating mandrel, a stripper plate having movement endwise of the mandrel, and a presser attached to and movable with the said stripper plate and adapted to bear on the outer surface of a roll of paper wound on said mandrel.

38. In a machine for the purpose set forth, the combination of an intermittingly rotating mandrel, and a movable bearing plate for the free end of the mandrel, adapted to swing outwardly and laterally to permit the removal of rolls of paper from said mandrel.

39. In a machine for the purpose set forth, the combination of an intermittingly rotating mandrel, and a movable bearing for the outer end of the mandrel, comprising a bearing plate pivotally supported on the frame of the machine and a spring applied to hold said bearing plate yieldingly in position for engagement with the mandrel.

40. In a machine for the purpose set forth, the combination of an intermittingly rotated mandrel, a stripper plate movable endwise of the mandrel, and means for delivering finished rolls from the machine comprising traveling belt adapted to receive rolls thrust from the mandrel by the said stripper plate.

41. In a machine for the purpose set forth, the combination of an intermittingly rotating mandrel, a stripper plate having movement endwise of the mandrel, and a roll delivering device comprising a horizontal traveling belt arranged to receive the rolls thrust from the mandrel by the said stripper plate and a yielding presser roll located above said traveling belt.

42. In a machine for the purpose set forth, the combination of an intermittingly rotating mandrel, a mandrel shaft, fast and slow turning pulleys on said shaft, provided with friction disks, a clutch member splined to the shaft between said disks, means for moving said clutch member endwise on the shaft to connect said shaft with the slow and fast turning pulleys, a movable trip member located in position to be acted upon by the web of paper wound upon the mandrel and operative connections between said trip member and the said clutch member, acting to shift said clutch member to its intermediate position and release the same from both of said pulleys when said trip member is moved.

43. In a machine for the purpose set forth, the combination of an intermittingly rotating mandrel, a mandrel shaft, fast and slow turning pulleys on said shaft, provided with friction disks, a clutch member splined to the shaft between said pulleys and adapted for frictional engagement therewith, an operating lever for said clutch member, a spring acting on the said operating lever to hold the clutch member in engagement with the fast turning pulley, a rotative cam, a lever actuated by said cam and acting on said operating lever to throw said clutch member into engagement with the slow moving pulley, a movable trip member, located in position to be acted upon by the web of paper being wound upon the mandrel and operative connections between said trip member and said operating lever, acting to move said operating lever to shift said clutch member out of contact with the fast turning pulley.

44. In a machine for the purpose set forth, the combination of an intermittingly rotating mandrel, a mandrel shaft, fast and slow turning pulleys mounted on said shaft and provided with friction disks, a clutch member splined to the shaft between said pulleys and adapted for frictional engagement therewith, an operating lever connected with said clutch member, a spring acting on said operating lever in a direction to hold the clutch member in contact with the fast turning pulley, a rotative cam, a lever operated by said cam, and acting on the said operating lever against the action of said spring, for shifting the said clutch member in contact with the slow turning pulley, a trip member located in position to be acted upon by the web of paper wound upon said mandrel, a rock-shaft provided with rigid arms to which said trip member is attached at its ends, a bell-crank lever on the machine frame, a connecting rod operating said bell-crank lever from said rock-shaft and a connecting rod extending from said bell-crank lever to the said operating lever.

45. In a machine for the purpose set forth, the combination of continuously rotating feed rolls, an intermittingly rotating mandrel, a horizontal paper supporting table located between the said feed rollers and mandrel and a vertically reciprocating cutting blade, extending transversely over said table, said table being provided with a slot to receive said blade.

46. In a machine for the purpose set forth, cutting mechanism for severing lengths from a continuous web of paper comprising a vertically reciprocating blade, an oscillating operating arm, a vertically swinging arm connected with said blade, a spring applied to hold said arm in its elevated position, an upright latch bar pivoted at its upper end to said operating arm, said latch bar being provided with two upwardly facing shoulders, a horizontally arranged lever pivoted to the machine frame and adapted to swing in a vertical plane, with its movable end engaging the notched edge of said latch bar, a spring applied to said latch bar to throw the notched edge thereof toward said swinging lever, a stop plate on the machine frame adapted for engagement with the lower shoulder on said latch bar and means for actuating said swinging lever.

47. In a machine for the purpose set forth, cutting mechanism for severing lengths from a continuous web of paper comprising a vertically reciprocating blade, a vertically swinging operating arm connected with said blade, a spring applied to hold said arm in its elevated position, an upright notched latch bar pivoted at its upper end to said operating arm, said latch bar being provided with two upwardly facing shoulders, a horizontally arranged lever pivoted to the machine frame and adapted to swing in a vertical plane with its swinging end in position for engagement with the notched edge of said latch bar, a spring applied to said latch bar to throw the notched edge thereof toward said swinging arm, a stop plate on the machine frame adapted for engagement with the lower shoulder on said latch bar, and means for actuating said swinging lever, comprising a rotative cam located below said lever and a spring acting downwardly upon said lever.

48. A machine for the purpose set forth, the combination of continuously rotating feed rolls, an intermittingly rotating mandrel, a cutting device for severing lengths of paper from a web of paper fed to the machine by said rolls, and means for gripping the severed end of the web and advancing it to the mandrel, comprising a gripper frame which is movable toward and from the mandrel and provided with a horizontal base plate over which the web of paper passes and gripping dogs acting to clamp the paper against said base plate.

49. In a machine for the purpose set forth, the combination of an intermittingly rotating mandrel provided with a clamping member, severing means embracing a vertically reciprocating cutting blade and means for advancing the severed end of the web to the mandrel comprising a horizontally movable paper guide adapted for movement beneath the cutting blade to a position with its forward edge adjacent to the mandrel.

50. In a machine for the purpose set forth, the combination of an intermittingly rotating mandrel provided with a clamping member, a severing device embracing a vertically movable cutting blade and means for gripping the severed end of the web and advancing it to the mandrel comprising a horizontally reciprocating gripping device and a horizontally reciprocating paper guide.

51. In a machine for the purpose set forth, the combination of an intermittingly rotating mandrel provided with a clamping member, a severing device embracing a vertically reciprocating cutting blade, a horizontally reciprocating gripping device embracing a base plate over which the paper passes and gripping dogs acting to press the paper against said base plate and a horizontally reciprocating paper guide, said gripping device having movement relatively to the paper guide for the purpose of advancing the end margin of the web beyond the forward end of the guide into position to be clamped to the mandrel.

52. In a machine for the purpose set forth, the combination of an intermittingly rotating mandrel, means for severing lengths of paper from a continuous web, means for holding the severed end of the web and advancing it to the mandrel comprising a horizontally reciprocating gripper frame, gripping dogs mounted on said frame and means for operating said dogs and giving reciprocatory motion to the gripper frame embracing a horizontally movable member connected with said gripping dog and adapted in its forward movement to first move the gripping dogs into gripping position and to then give advance movement to the gripper frame.

53. In a machine for the purpose set forth, the combination of an intermittingly rotating mandrel provided with a clamping member, means for severing lengths of paper from a continuous web, a reciprocating gripping device embracing a base plate over which the paper passes, gripping dogs pivoted above said base plate and means for operating said gripping dogs and giving bodily movement to the gripping device, comprising a horizontally moving operating member pivotally connected with the upper end of said gripping dogs.

54. In a machine for the purpose set forth, the combination of an intermittingly rotating mandrel, provided with a clamping member, means for severing lengths of paper from a continuous web, a horizontally reciprocating gripping device, a horizontally reciprocating paper guide, stops limiting the forward and backward movements of said paper guide, actuating means connected with the gripping device for giving reciprocating movement thereto and means yieldingly connecting said gripping device with the paper guide, affording limited movement between said gripping device and paper guide.

55. In a machine for the purpose set forth, the combination of a reciprocating gripping device comprising a base plate, upwardly extending brackets on the ends of said base plate and gripping dogs, a reciprocating paper guide, stops on the machine frame for limiting the forward and rearward movements of said paper guide, brackets on said paper guide, rods secured to the brackets on the gripping device and extending through said brackets on the paper guide, said rods being provided with stops to limit the separation of the paper guide from the gripping device and springs acting to yieldingly hold the paper guide and gripping device at a distance from each other.

56. In a machine for the purpose set forth, the combination of a horizontally reciprocating gripping device embracing a base plate, brackets rising from the ends of said base plate and gripping dogs, a horizontally reciprocating paper guide, brackets rising from the paper guide, rods secured to the brackets on the gripper frame and having sliding engagement with the brackets on the paper guide, said rods being provided with stops to limit the separation of the gripping device and paper guide, springs applied to said rods between said brackets on the gripping device and paper guide, said rods being extended rearwardly from the gripping device, stationary guide brackets with which said rods have sliding engagement and guide rods on the gripping device having sliding engagement with said stationary guide brackets.

57. In a machine for the purpose set forth, the combination of a reciprocating gripping device and means for giving movement to said gripping device comprising a horizontally movable actuating member, a horizontally swinging lever pivoted at one end to the machine frame and engaging said actuating member, a horizontal shaft provided with a cam having a lateral cam face operating on said swinging lever to give advance movement to the gripping device and a spring applied to retract said gripping device.

58. In a machine for the purpose set forth, the combination of a horizontally movable gripping device, a horizontally movable paper guide, stops limiting the forward and rearward movements of said paper guide, a yielding connection between the gripping device and paper guide, a horizontally movable actuating member connected with the gripping device, a transversely arranged, swinging lever engaged with the said actuating member, a rotative cam acting on said swinging lever to give advance movement to the gripping device and paper guide and a spring applied to give retractive movement to said gripping device and paper guide.

59. In a machine for the purpose set forth, the combination of a horizontally reciprocating gripping device a horizontally reciprocating paper guide, a yielding connection between said gripping device and paper guide, a horizontal, endwise sliding rod connected with the gripping device, a transversely arranged horizontally swinging lever connected with said endwise sliding rod, a rotative cam acting on said lever to give advance movement to the said rod, a contractile coiled spring acting to give retractive movement to said rod and an expansively acting coiled spring acting to resist the momentum of the moving parts in the retractive movement of the gripping device and paper guide.

60. In a machine for the purpose set forth, the combination of an intermittingly rotating mandrel, provided with a clamping member, means for severing lengths of paper from a continuous web, means for gripping the severed end of the web and advancing it toward the mandrel, and a reciprocating paper guide, interposed between said gripping means and the mandrel and embracing upper and lower parallel plates forming between them a narrow guide passage for the paper.

61. In a machine for the purpose set forth, the combination of continuously rotating feed rolls, an intermittingly rotating mandrel provided with a clamping member, a paper supporting table located between said mandrel and the feed rolls, a severing device embracing a vertically reciprocating cutting blade, located over said table adjacent to the mandrel, a gripping device sliding horizontally on said table toward and from the mandrel and a paper guide mounted on said table between the gripping device and the mandrel.

62. In a machine for the purpose set forth, the combination of continuously rotating feed rolls, an intermittingly rotated mandrel provided with a clamping member, a paper supporting table located adjacent to the mandrel, a paper receptacle located between the feed rolls and said table, a vertically reciprocating cutting blade located transversely over said table, a gripping device mounted on said table and having reciprocatory motion toward and from the mandrel and a paper guide mounted on said table between the gripping device and the mandrel and having reciprocatory movement by which its forward end is carried beneath the cutting blade to a position adjacent to the mandrel.

63. In a machine for the purpose set forth, the combination of an intermittingly rotating mandrel provided with a clamping member, a paper supporting table located adjacent to the mandrel, a vertically movable cutting blade located transversely over said table, a reciprocating paper guide mounted on said table and movable beneath the cutting blade toward and from the mandrel, longitudinal guide pieces at the sides of the table engaging the side edges of said paper guide, laterally projecting arms on the rear end of the paper guide which rest and slide upon said longitudinal guide pieces, stops on said guide pieces in the path of said laterally projecting arm for limiting the forward and rearward movements of the paper guide, a reciprocating gripping device, means connected with said gripping device for moving the same toward and from the mandrel and a yielding connection between the said gripping device and paper guide.

64. In a machine for the purpose set forth, the combination of continuously rotating feed rolls, an intermittingly rotating mandrel, provided with clamping member, a severing device, a gripping device movable toward and from said mandrel, driving means applied to turn one of said feed rolls, a longitudinally extending cam shaft, gearing connecting said cam shaft with the driven feed roll and means for operating said cutting device and the said gripping device including cams on said cam shaft.

65. In a machine for the purpose set forth, the combination of continuously rotating feed rolls, an intermittingly rotating mandrel provided with a clamping member, a mandrel shaft, a main driving shaft, driving connections between said main driving shaft and one of the feed rolls, driving connections between said main driving shaft and the mandrel shaft embracing a friction clutch, cutting mechanism, a reciprocating gripping device having movement toward and from the mandrel, a cam shaft, gearing connecting the said cam shaft with the driven feed roller and means for operating the said friction clutch, for operating said clamping member, for operating said cutting device and for operating said gripping mechanism, each of said operating means including a cam on said cam shaft.

66. In a machine for the purpose set forth, the combination of continuously rotating feed rolls, an intermittingly rotating mandrel, provided with a clamping member, a mandrel shaft, a main driving shaft, gearing connecting said main driving shaft with one of the feed rolls, pulleys on the main driving shaft and the mandrel shaft, a friction clutch on said mandrel shaft for connecting the same with the pulley thereon, a cutting mechanism, a gripping device movable toward and from the mandrel, a rotative cam shaft, gearing connecting said cam shaft with the driven feed roll, and actuating mechanism for the said clutch on the mandrel shaft, for the said clamping member, for the cutting mechanism and for the gripping device, each of said actuating mechanisms including a cam on the said cam shaft.

67. In a machine for the purpose set forth, the combination of continuously rotating feed rolls, an intermittingly rotating mandrel provided with a clamping member, a stripping plate movable endwise of the mandrel, a cutting mechanism, a gripping device movable toward and from the mandrel, a main driving shaft, driving connections between said main driving shaft and the mandrel, including a friction clutch, driving connections between said main driving shaft and one of the feed rolls, a cam shaft, gearing connecting said cam shaft with the driven feed roll and actuating means for operating said friction clutch, for operating said clamping member, for operating the stripping plate, for operating the cutting mechanism, and for operating the gripping device, each of said actuating mechanisms embracing a cam on said cam shaft.

68. In a machine for the purpose set forth, the combination of continuously rotating feed rolls, an intermittingly rotating mandrel, provided with a clamping member, a cutting device, a gripping device having movement toward and from the mandrel, a main driving shaft, gearing connecting said main driving shaft with one of the feed rolls, driving connections between said main driving shaft and the mandrel, embracing a friction clutch, actuating mechanism for operating said friction clutch, for operating said clamping member, for operating said cutting device and for operating said reciprocating gripping device, each of said actuating mechanisms, including a rotating cam, a cam shaft to which said cams are attached, gearing connecting said cam shaft with the driven feed roll, and a movable trip member adapted to be acted upon by the web of paper in its part which extends between the feed rolls and the mandrel and which is connected with and operates said friction clutch.

In testimony, that I claim the foregoing as my invention I affix my signature in the presence of two witnesses, this 23rd day of July A. D. 1907.

STEWART WARING.

Witnesses:
S. D. HIRSCHL,
P. H. ALFREDO.